US012311469B2

(12) United States Patent
Ortner et al.

(10) Patent No.: US 12,311,469 B2
(45) Date of Patent: May 27, 2025

(54) METHODS AND DEVICES FOR INTRODUCING SEPARATION LINES INTO TRANSPARENT BRITTLE FRACTURING MATERIALS

(71) Applicant: SCHOTT AG, Mainz (DE)

(72) Inventors: Andreas Ortner, Gau-Algesheim (DE); Clemens Kunisch, Arnsheim (DE); Frank-Thomas Lentes, Bingen (DE); Jens Ulrich Thomas, Mainz (DE); Kurt Nattermann, Ockenheim (DE); Michael Kluge, Offenbach am Main (DE)

(73) Assignee: SCHOTT AG, Mainz (DE)

( * ) Notice: Subject to any disclaimer, the term of this patent is extended or adjusted under 35 U.S.C. 154(b) by 77 days.

(21) Appl. No.: 16/994,724

(22) Filed: Aug. 17, 2020

(65) Prior Publication Data

US 2020/0376603 A1 Dec. 3, 2020

Related U.S. Application Data

(63) Continuation of application No. PCT/EP2019/053344, filed on Feb. 11, 2019.

(30) Foreign Application Priority Data

Feb. 15, 2018 (DE) ...................... 10 2018 103 456.3
Oct. 23, 2018 (DE) ...................... 10 2018 126 381.3

(51) Int. Cl.
B23K 26/359 (2014.01)
B23K 26/06 (2014.01)
(Continued)

(52) U.S. Cl.
CPC ........ *B23K 26/359* (2015.10); *B23K 26/0622* (2015.10); *B23K 26/067* (2013.01);
(Continued)

(58) Field of Classification Search
CPC ............ B23K 2103/52; B23K 2103/54; B23K 26/0608; B23K 26/0613; B23K 26/0622;
(Continued)

(56) References Cited

U.S. PATENT DOCUMENTS 7,538,948 B2 * 5/2009 Muenz ............... G02B 27/0966
359/619
8,335,034 B2 12/2012 Bernet
(Continued)

FOREIGN PATENT DOCUMENTS

DE 102013223637 5/2015
DE 102014116957 5/2016
(Continued)

OTHER PUBLICATIONS

Dudutis, "Modification of glass using an axicon generated non-symmetrical Bessel Gaussian beam", SPIE LASE, 2017, San Francisco, California, United States, 12 pages.
(Continued)

Primary Examiner — Brian W Jennison
Assistant Examiner — Adam M Eckardt
(74) Attorney, Agent, or Firm — Ruggiero McAllister & McMahon LLC

(57) ABSTRACT

A method for preparing a workpiece for separation is provided that includes providing a workpiece that is transparent for light of a pulsed laser beam, splitting the laser beam into two partial beams using an optical system, directing both partial beams onto the workpiece, and moving the workpiece and the partial beams relative to one another. The partial beams are directed onto the workpiece incident at different angles to the normal of the irradiated surface and superimposed inside the workpiece such that the partial beams interfere with one another to form a sequence of intensity maxima inside the workpiece. The intensity at the
(Continued)

intensity maxima is sufficiently high to modify the material of the workpiece so that a chain-like periodic pattern of material modifications is formed along a path defining a separation line.

6 Claims, 21 Drawing Sheets

(51) Int. Cl.
  *B23K 26/0622* (2014.01)
  *B23K 26/067* (2006.01)
  *B23K 103/00* (2006.01)
(52) U.S. Cl.
  CPC ...... *B23K 26/0648* (2013.01); *B23K 2103/52* (2018.08); *B23K 2103/54* (2018.08)
(58) Field of Classification Search
  CPC ............ B23K 26/0624; B23K 26/0648; B23K 26/067; B23K 26/0676; B23K 26/0736; B23K 26/08; B23K 26/359; B23K 26/53; B23K 26/55; C03B 33/0222; Y02P 40/57; G02B 5/001; G02B 27/0905; G02B 27/10
  See application file for complete search history.

(56) References Cited

U.S. PATENT DOCUMENTS

| | | | |
|---|---|---|---|
| 9,656,349 B2 | 5/2017 | Mori | |
| 9,851,571 B1* | 12/2017 | Zhang | G02B 27/0966 |
| 10,377,658 B2* | 8/2019 | Schnitzler | B23K 26/0006 |
| 10,882,143 B2* | 1/2021 | Kumkar | B23K 26/073 |
| 2006/0109556 A1 | 5/2006 | Guldevall | |
| 2010/0025387 A1 | 2/2010 | Arai | |
| 2010/0309566 A1* | 12/2010 | DeWitt | G02B 17/084 359/729 |
| 2012/0223061 A1 | 9/2012 | Atsumi | |
| 2012/0320458 A1 | 12/2012 | Knutson | |
| 2013/0272653 A1 | 10/2013 | Le | |
| 2014/0199519 A1 | 7/2014 | Schillinger | |
| 2015/0140735 A1 | 5/2015 | Hosseini | |
| 2016/0031745 A1 | 2/2016 | Ortner | |
| 2016/0223801 A1* | 8/2016 | Kiontke | G02B 5/001 |
| 2016/0377874 A1 | 12/2016 | Zhou | |
| 2017/0008793 A1* | 1/2017 | Bankaitis | C03B 33/091 |
| 2017/0120374 A1* | 5/2017 | Hendricks | B23K 26/0624 |
| 2017/0259375 A1 | 9/2017 | Kumkar | |
| 2018/0005922 A1 | 1/2018 | Levesque, Jr. | |
| 2018/0062342 A1* | 3/2018 | Comstock, II | B23K 26/0624 |
| 2018/0134604 A1 | 5/2018 | Ortner | |
| 2018/0186679 A1 | 7/2018 | Wada | |
| 2018/0221988 A1* | 8/2018 | Liu | B23K 26/0624 |
| 2018/0259779 A1* | 9/2018 | Tamura | G02B 27/09 |
| 2019/0062196 A1* | 2/2019 | Bui | C03B 33/091 |
| 2019/0129093 A1* | 5/2019 | Li | H01S 5/02251 |
| 2019/0255660 A1* | 8/2019 | Mori | B23K 26/0652 |
| 2019/0283178 A1 | 9/2019 | Mishchik | |
| 2019/0358750 A1* | 11/2019 | Ito | B23K 26/0648 |
| 2020/0101561 A1* | 4/2020 | Ortner | B23K 26/083 |
| 2020/0290156 A1* | 9/2020 | Suwa | B23K 26/0622 |
| 2020/0376603 A1* | 12/2020 | Ortner | B23K 26/359 |

FOREIGN PATENT DOCUMENTS

| | | | |
|---|---|---|---|
| DE | 102015116848 | 4/2017 | |
| EP | 2754524 | 7/2014 | |
| JP | 2011170052 | 9/2001 | |
| JP | 2005288503 | 10/2005 | |
| JP | 2008062263 | 3/2008 | |
| JP | 2010042424 | 2/2010 | |
| JP | 2011056544 | 3/2011 | |
| JP | 2017007926 | 1/2017 | |
| KR | 101407993 | 6/2014 | |
| KR | 101655428 | 9/2016 | |
| WO | 2012006736 | 1/2012 | |
| WO | WO-2012127880 A1 * | 9/2012 | ......... G01B 9/02035 |
| WO | 2013138802 | 9/2013 | |
| WO | 2014075995 | 5/2014 | |
| WO | WO-2016079275 A1 * | 5/2016 | .......... B23K 26/042 |
| WO | 2017009379 | 1/2017 | |
| WO | 2018011618 | 1/2018 | |
| WO | 2018020144 | 2/2018 | |
| WO | 2018155099 | 8/2018 | |

OTHER PUBLICATIONS

Kampmann, "Optical system for trapping particles in air", Applied Optics, Feb. 1, 2014, vol. 53, No. 4, 8 pages.

* cited by examiner

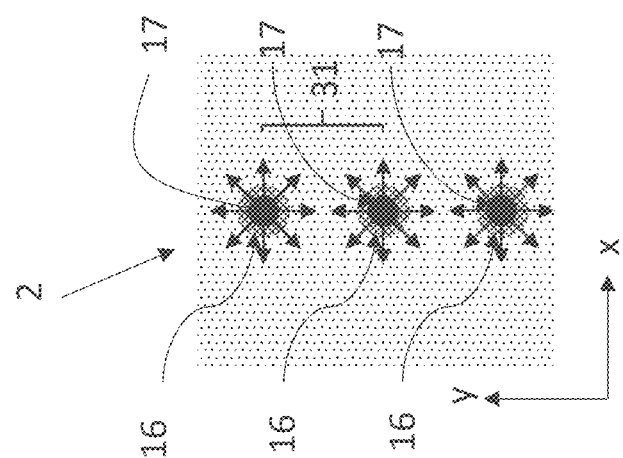
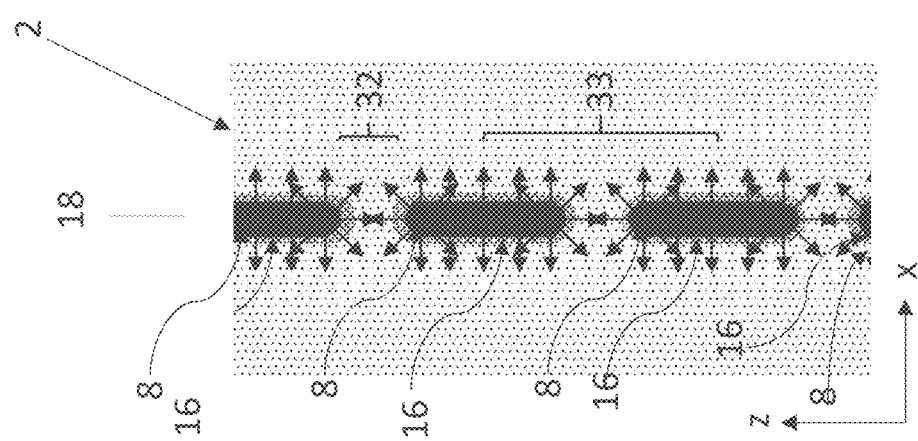

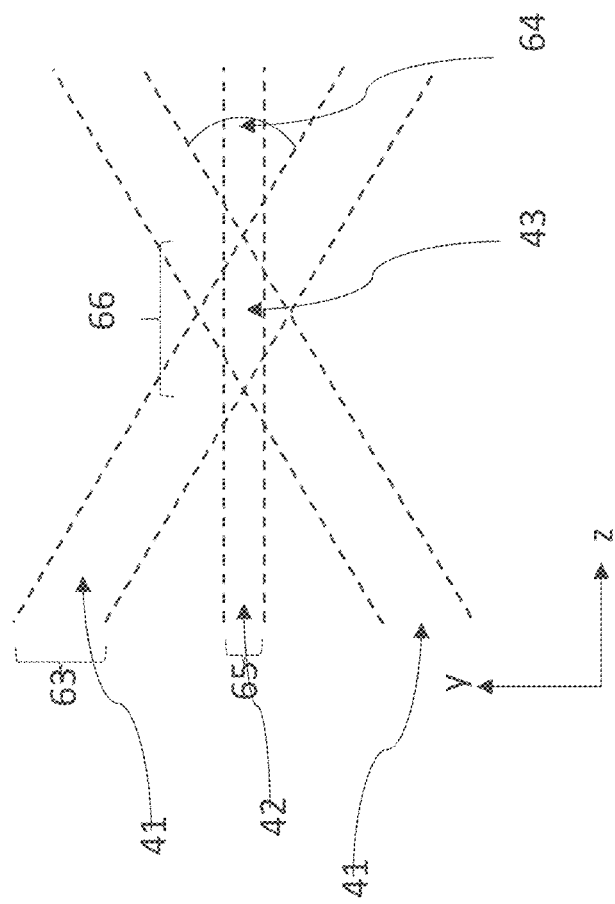
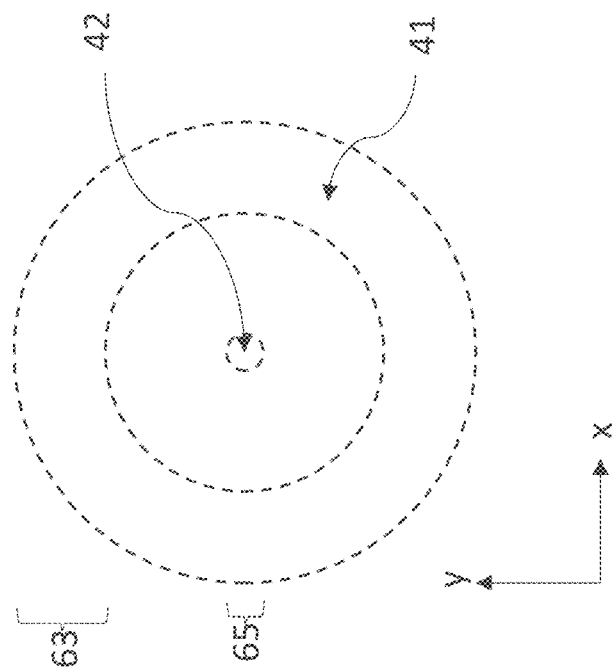
FIG. 5a
FIG. 5b

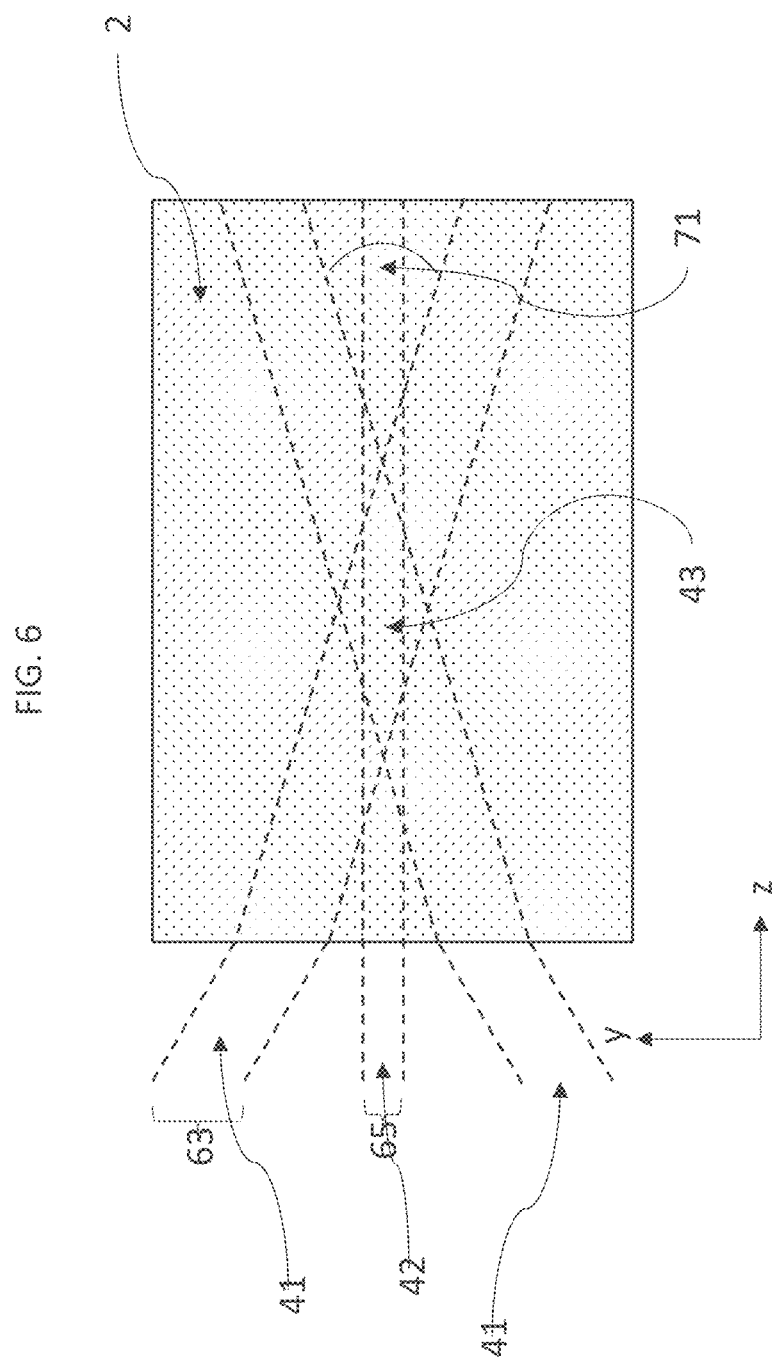

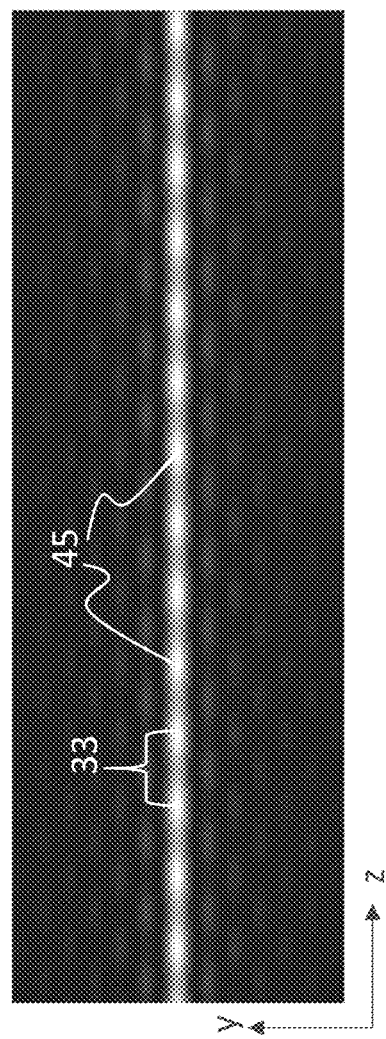

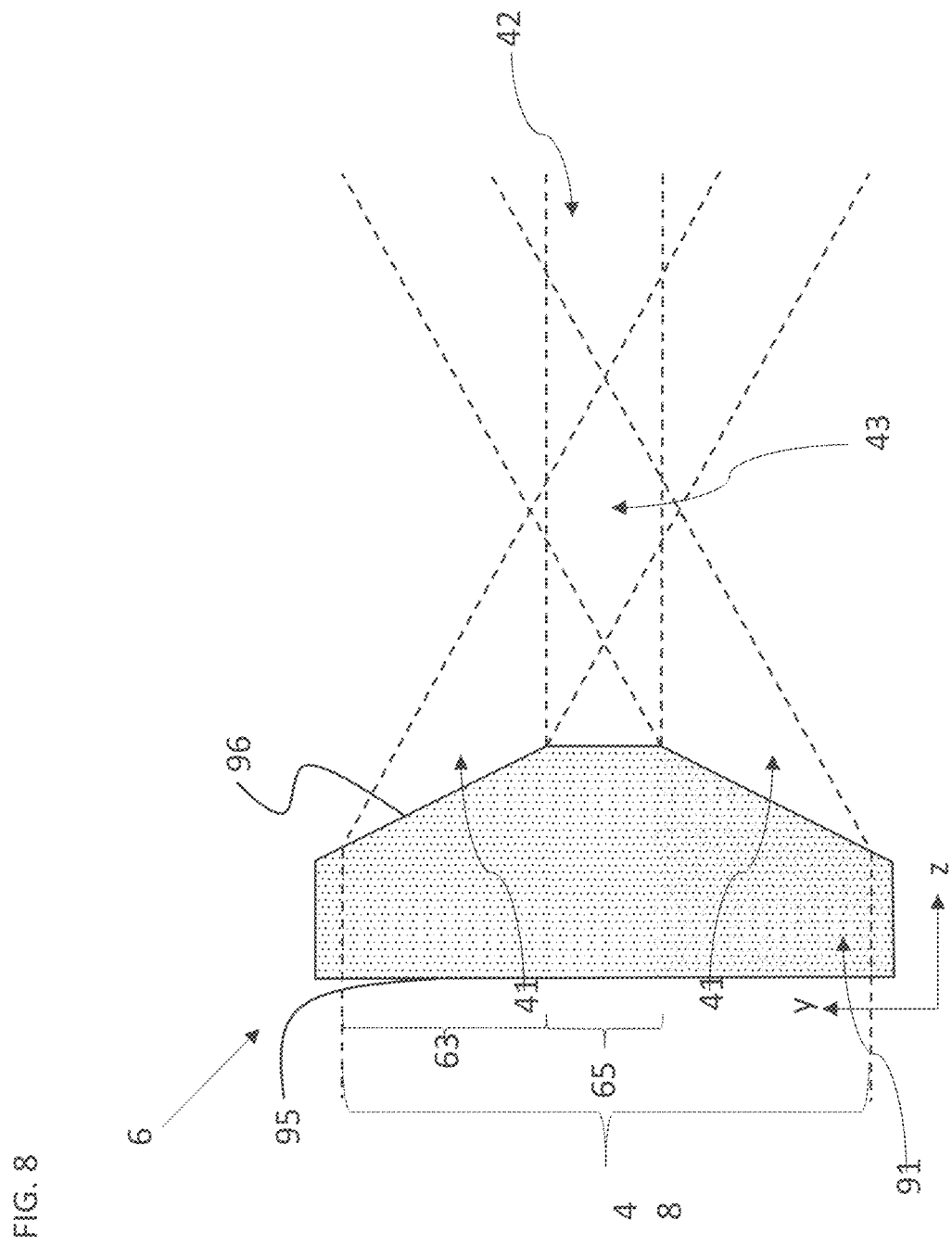

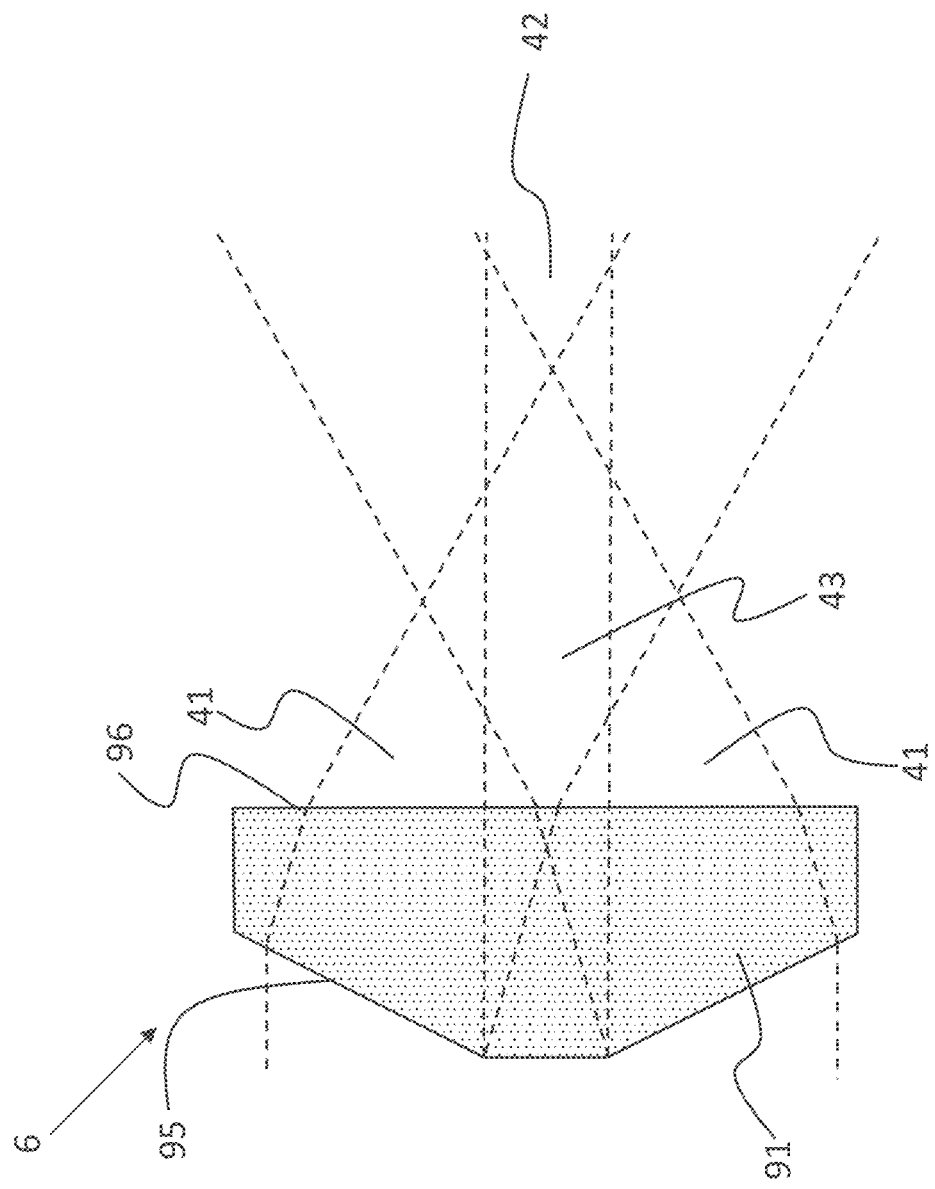

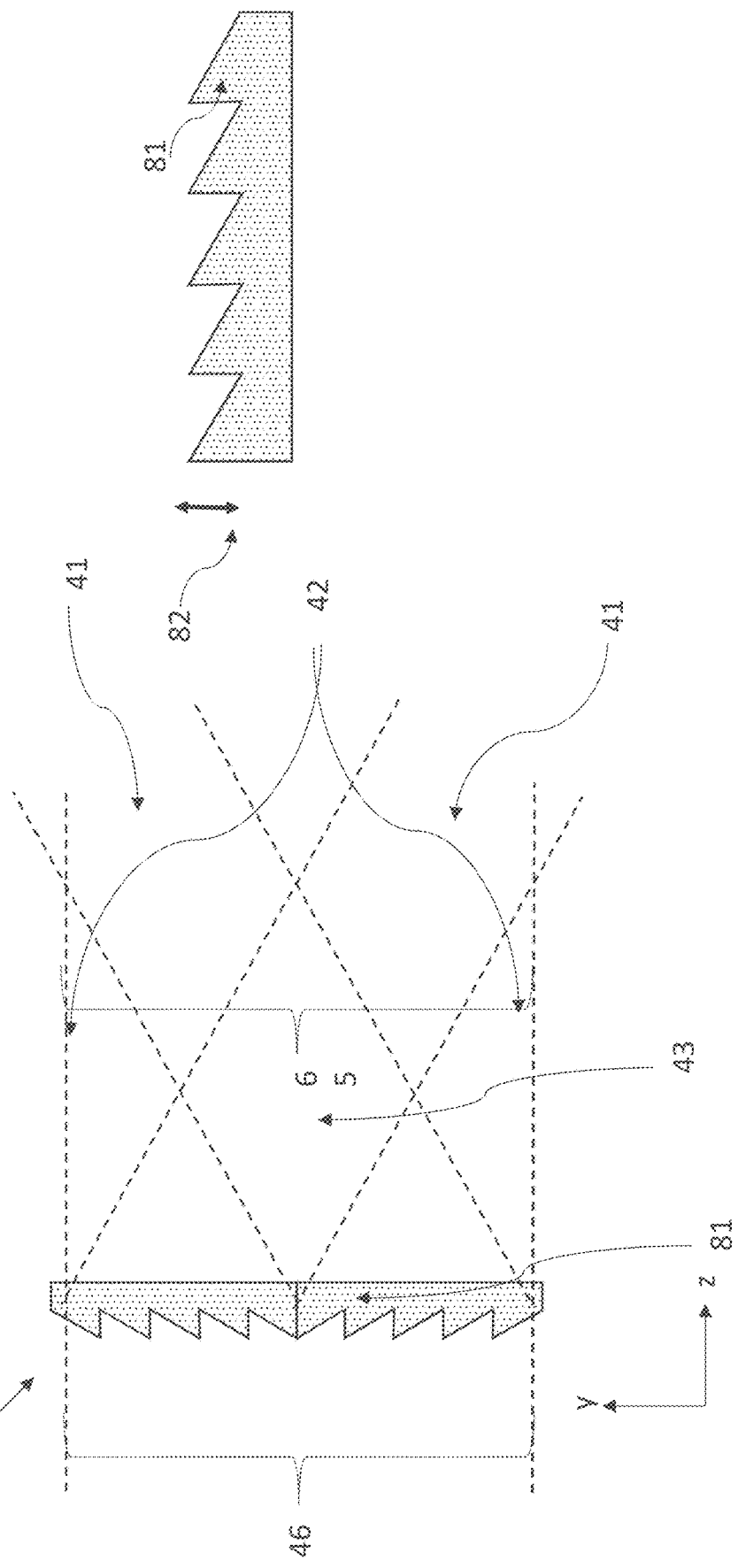

METHODS AND DEVICES FOR INTRODUCING SEPARATION LINES INTO TRANSPARENT BRITTLE FRACTURING MATERIALS

CROSS REFERENCE TO RELATED APPLICATIONS

This application is a continuation of International Application PCT/EP2019/053355 filed Feb. 11, 2019, which claims benefit under 35 USC 119 of German Application 10 2018 103 456.3 filed Feb. 11, 2018 and German Application 10 2018 126 381.3 filed Oct. 23, 2018, the entire contents of each of which is incorporated by reference herein.

BACKGROUND

1. Field of the Invention

The invention generally relates to material processing of workpieces by separating the workpiece along designated lines.

2. Description of Related Art

In order to separate glass sheets along an intended line, a score-and-break process is often applied. The glass is first scored along a line and then broken by applying a bending load along the line. However, a problem arising here is that in particular in the case of rather thick glasses or glass panels, the edge surface that is produced as a result of breakage along the line may not run along this line and may not be perpendicular to the faces.

WO 2012/006736 A2 discloses a method for preparing a substrate for separation using one or more ultra-short laser pulses (shorter than 100 ps) by producing spaced-apart filaments by exploiting a non-linear effect of self-focusing along the intended separation line of the substrate.

WO 2017/009379 A1 describes a further development to this method, where modifications are produced that extend obliquely to the surface of the substrate.

From EP 2 931 467 B1 it is known to include the ambient atmosphere as a further process parameter in order to prevent premature self-cleaving due to subcritical crack growth.

Furthermore, DE 10 2015 116 848 A1 describes the introducing of a zone of defined strength by producing a filament using spherical aberration of a lens in which the Gaussian beam of the ultra-short pulsed laser is converted into a line focus with uneven intensity distribution along the optical axis. Although these methods produce non-equidistant material modifications with lower breaking stress in the thickness direction of the material, the length of the material modification is disadvantageously limited to typically not more than approximately 3 mm. Furthermore, the uneven intensity distribution has a disadvantageous effect on the required high positional accuracy of the glass panel relative to the line focus: even if the glass panel is considerably thinner than the length of the line focus, a spacing of approx. 50 μm must be maintained between panel and optics.

EP 2 754 524 B1 and DE 10 2013 223 637 A1 describe methods in which the filament is produced by generating a Bessel-Gaussian beam (i.e. transforming a Gaussian beam into a Bessel beam with a Gaussian envelope) using suitable optics (preferably using at least one axicon). Material modifications produced in this way are approximately homogeneously distributed along the optical axis and therefore require significantly higher breaking stresses than in the aforementioned methods. These significantly higher breaking stresses have a disadvantageous effect, since, although the produced modifications have significantly longer lengths (up to 15 . . . 20 mm), the subsequent separation process along the pre-perforated line generally does not succeed, due to occurring sub-critical crack growth. The use of axicons for generating Bessel-like annular beams is also known from WO 2018/011618 A1; DE 10 2014 116957 A1; US 2018/0005922 A1; and from Juozas Dudutis et al, "Modification of glass using an axicon generated non-symmetrical Bessel-Gaussian beam", Proc. SPIE 10091, Laser Applications in Microelectronic and Optoelectronic Manufacturing, Feb. 20, 2017.

Also known from the generic prior art are optical systems for simultaneously generating a plurality of foci, consisting of the combination of a lens with a diffractive optical element (DOE). A drawback of such setups is that the number of foci is limited to a few orders, their mutual spacing is not constant and is moreover significantly too large (typically >100 μm) for the purposes pursued here.

SUMMARY

In view of the separation methods described above, the invention is based on the object to prepare a brittle fracturing transparent substrate of large thickness for a separation process and to produce a prepared separation line along which the substrate can be separated without high breaking forces and without the associated risk of conchoidal fractures on the so produced edge.

This object is achieved by the embodiments and refinements are specified herein.

A key idea of the invention is to prepare for a subsequent separation process by optical material modifications that are introduced using an ultra-short pulsed laser in such a way, by suitable beam shaping, that the generated material modifications allow for a breaking process in controlled manner and with low breaking stress $\sigma_B$. The separation process may be effected much later than the material modification process according to the invention.

The invention allows to easily cleave even thick glass or glass ceramic elements, once the material modifications have been introduced in a special pattern. Such a pattern can be achieved by splitting the laser beam of an ultra-short pulsed laser into two partial beams which interfere with each other in an interaction area inside the element to be processed in such a way that intensity maxima arise, which are regularly spaced apart in the direction of irradiation, i.e. emanating from the separation line on the surface of the element and extending into the interior thereof. The intensity of the laser is dimensioned such that a material modification arises in the intensity maxima, but preferably not in the minima between the maxima, or a weaker one.

The distance between the maxima is determined by the wavelength of the laser light and is therefore regular.

Accordingly, the invention thus provides a method for preparing a workpiece for separation or for being cleaved, which method comprises providing a workpiece, preferably made of brittle hard material, which is transparent for light of a pulsed laser beam; and splitting the laser beam into at least two partial beams by an optical system, both partial beams being directed onto the workpiece so as to be incident on the workpiece at different angles to the normal of the irradiated surface and to be superimposed inside the workpiece such that the partial beams interfere with one another so as to form a sequence of intensity maxima inside the workpiece, which are lined up one after the other along an overlapping area of the partial beams, and wherein the intensity at the intensity maxima is sufficiently high to modify the material of the workpiece so that a chain-like periodic pattern of material modifications is formed; and moving the workpiece and the partial beams relative to one another such that a multitude of chain-like periodic patterns of material modifications are produced along a path defining a separation line.

A corresponding device for carrying out the method for preparing a workpiece for separation accordingly comprises: a laser for generating a pulsed laser beam; and an optical system for splitting the laser beam into at least two partial beams and for directing them onto a workpiece to be processed; a positioning device for placing and aligning the workpiece and the laser beam relative to each other such that the two partial beams are incident on the workpiece at different angles relative to the normal of the irradiated surface and are superimposed inside the workpiece such that the partial beams interfere with one another so as to form, inside the workpiece, a sequence of intensity maxima successively lined up along the overlapping area of the partial beams, wherein the laser is operable to generate pulses of sufficiently high energy so that the pulse energy of the laser pulses is sufficient to modify the material of the workpiece so that a chain-like periodic pattern of material modifications is produced; and wherein the positioning device is adapted to move the laser beam with its two partial beams and the workpiece relative to one another so that a multitude of chain-like periodic patterns of material modifications are generated along a path that defines a separation line.

The central element of the device for carrying out the method according to the invention is the optical system for splitting the incident laser beam into two partial beams. Preferably, so-called axicons are used for the optical system.

Axicons are conical lenses that transform an incident "parallel" beam into a ring-shaped beam (transform a plane wave into a ring-shaped intensity distribution concentrically arranged around the optical axis). Instead of a focal point, a linear intensity distribution is obtained along the optical axis. The beam profile generated by an axicon is a locally limited Bessel-like beam that arises as a result of the interference along the optical axis. In the present invention, the locally limited Bessel-like beam is caused to interfere with a further partial beam. In the exemplary embodiments, this is usually a central beam propagating along the optical axis. In the simplest embodiment, a truncated axicon is used, i.e. which has a central face instead of the cone tip, and which causes the incident laser beam to be split up into a first partial beam having a ring shape and a central beam propagating centrally along the optical axis, which will be referred to as a second partial beam below. These two partial beams interfere in elongated zones along the optical axis. The desired modifications in the material to be processed are produced in the intensity maxima of these elongated interference zones.

The position and the spacing of the interference zones can be varied in particular through a choice of the specific shape of the axicon(s) used. The various embodiments of the device according to the present invention therefore differ in the specific embodiments of the axicons used for the optical system.

In a first embodiment, the optical system comprises a plano-convex axicon with the planar side thereof facing the incident laser beam and the convex side having the shape of a truncated cone.

In a further embodiment, the optical system comprises a plano-convex axicon with the convex side thereof facing the incident laser beam and the convex side having the shape of a truncated cone.

In yet another embodiment, the optical system comprises a plano-convex axicon with a glass cone arranged centrally on the planar side thereof.

In yet another embodiment, the optical system comprises a concave-convex axicon, with the convex side thereof having the shape of a truncated cone and the concave side thereof having the contour of a truncated cone.

In yet another embodiment, the optical system comprises a biconvex axicon with the two convex sides of the axicon in the form of truncated cones of different heights.

In yet another embodiment, the optical system comprises at least three plano-convex axicons, with the convex sides of the at least three axicons having the shape of truncated cones.

In yet another embodiment, the optical system comprises at least one axicon which is in the form of a concentric ring grating.

In yet another embodiment, the optical system comprises at least three axicons in the form of concentric ring gratings.

Regardless of the specific configuration of the optical system, the laser light is particularly preferably split by the appropriately designed optical system in such a way that the two partial beams, in particular the ring beam and the central beam, have comparable intensities. Comparable intensities are understood to mean that the intensities differ by no more than a factor of 100, preferably by no more than a factor of 50, more preferably by no more than a factor of 10, even more preferably by no more than a factor of 3, most preferably by no more than a factor of 1.5. This ensures that a strong intensity variation is achieved in the interference pattern of the partial beams overlapping within the workpiece.

The laser power is irradiated into a transparent element or workpiece, in particular a workpiece made of glass or glass ceramic, using the beam shaping element according to the invention, and as a result of the interaction with such radiation distribution this workpiece will be provided with a regular 2-dimensional pattern of compression areas and depletion areas of the material along a plane emanating from a separation line and extending across the element. The tensile stress-strain zones thereof may overlap and may be so strong that cracks propagate along the plane and allow for later breaking along this plane.

The method according to the invention in particular permits to produce a glass or glass ceramic workpiece which has two surfaces and a pattern of material modifications along a plane, each of the modifications being surrounded by a compression zone. The material modifications are lined up one after the other in lines. Along a line, the material modifications are arranged in a regular sequence, namely the sequence corresponding to the periodicity of the maxima of the interference pattern. The plane inside the workpiece is now defined by a multiplicity of adjacent lines, and the lines of material modifications extend from one of the two surfaces of the glass or glass ceramic workpiece to the opposite surface thereof.

On the one hand, the glass or glass ceramic workpiece may be sheet-like, so that the surfaces are two opposite faces. On the other hand, the glass or glass ceramic workpiece may be tubular, so that the two surfaces are concentric lateral surfaces. As already mentioned, the invention is also particularly suitable for separating thick glass or glass ceramic workpieces. The invention is suitable for a wide range of substrate thicknesses from 10 µm to 50 mm. According to an advantageous embodiment of the invention, it is contemplated that the thickness of the workpiece or substrate ranges from 1 mm to 25 mm. The advantages of the invention are furthermore particularly evident even in the case of large thicknesses of 10 mm, in particular 20 mm and more, since the separating of such thick workpieces in a controlled manner is otherwise very difficult.

The glass or glass ceramic workpiece preferably has a fracture face or edge exhibiting lines extending next to each other and being defined by material modifications that are arranged in a regularly chain-like pattern one behind the other with a center distance along the lines between 1 µm and 100 µm and a diameter from 0.2 µm to 5 µm, and which are each surrounded by a compression zone.

BRIEF DESCRIPTION OF THE FIGURES

The invention will now be described in more detail with reference to the accompanying figures in which the same reference numerals denote the same elements, and wherein:

FIGS. 4a and 4b are schematic diagrams of a modification in a plan view and a side view, respectively;

FIG. 5a shows a schematic diagram of a beam profile of a Bessel-Gaussian beam and a central beam as seen in the direction of beam propagation;

FIG. 5b shows a schematic diagram of the interference of a Bessel-Gaussian beam and a central beam;

FIG. 6 is a schematic diagram of the interference of the Bessel-Gaussian beam and the central beam inside the material of the workpiece;

FIG. 7 shows a calculated intensity distribution of the interference between the Bessel-Gaussian beam and the central beam;

FIG. 8 shows the beam paths when using a plano-convex axicon, with the planar side of the axicon facing the incident laser beam;

FIG. 9 shows the beam paths when using a plano-convex axicon, with the convex side of the axicon facing the incident laser beam;

FIG. 15 shows the beam paths when using an axicon in the form of a concentric ring grating;

FIG. 16 is a sectional view of the ring grating;

DETAILED DESCRIPTION

Figure 1:
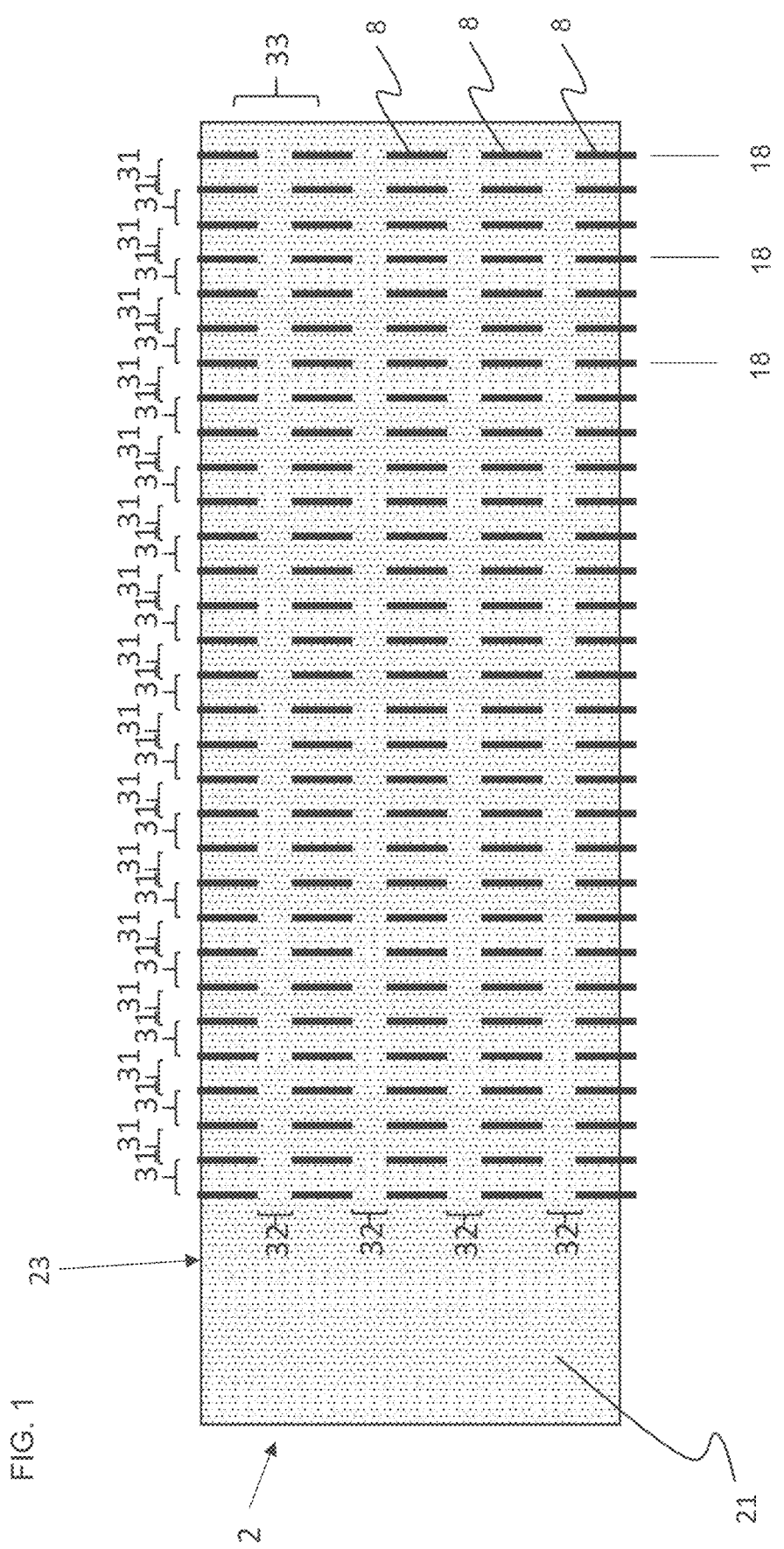
FIG. 1 is a schematic diagram of the modifications produced in a workpiece by the method according to the invention.
Figure 2:
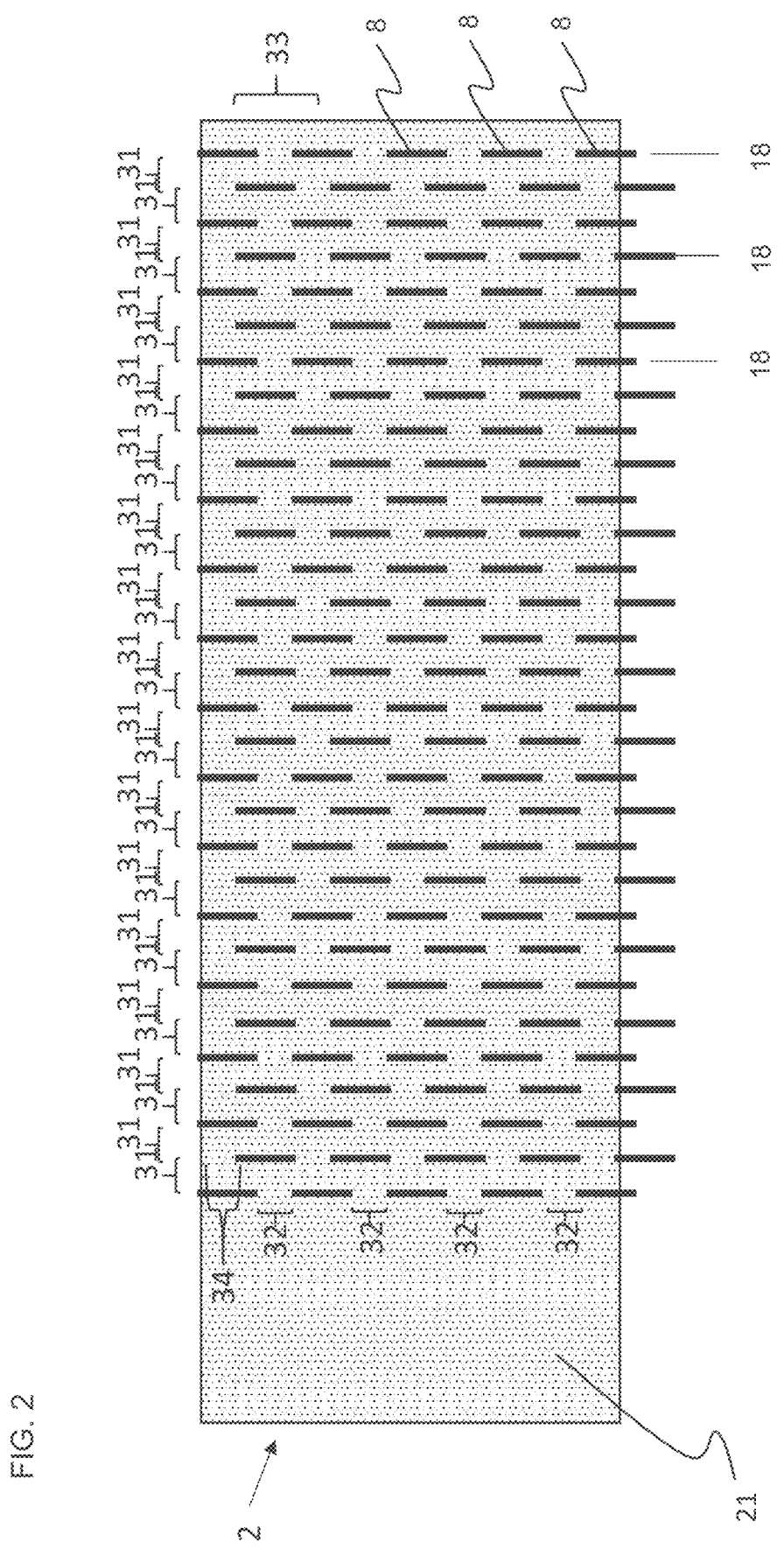
FIG. 2 is a schematic diagram of a further possible pattern of modifications produced in a workpiece by the method according to the invention.

FIGS. 1 and 2 schematically show a cross-sectional plane of a workpiece 2 that has been treated according to the invention, with a surface 21 that corresponds to a substrate surface 23. The radiation source used for treating the workpiece 2 was a laser, not shown here, preferably a pulse laser. Partial beams 41, 42, not shown here, are incident from above and produce modifications 8 in their interference or compression zones, which are periodically arranged along lines 18, corresponding to a dashed focus. At a later time, the workpiece 2 may be separated into individual sections by being mechanically broken along the lines 18. The areas of material modifications 8 are overall represented by vertical lines in FIG. 1. The workpiece 2 is preferably a glass or glass ceramic substrate. Silicon, plastics, laminates, and pipes can also be treated according to the invention.

The multiplicity of lines 18 extending parallel to one another are produced by moving the workpiece 2, by a positioning device, perpendicular to the irradiation direction of the partial beams. Coordination between the pauses between the pulses or bursts of the laser that is employed as the radiation source and the relative velocity between the workpiece and the device of the invention allows to predefine the horizontal spacing of the lines 9 of modifications 8.

In an alternative embodiment, the workpiece is moved in the direction of the optical axis during the modification process by the laser, which causes a continuous material modification. This modification may subsequently be opened by etching. This creates a filamentary channel with a diameter of less than 200 mm, preferably less than 100 µm, more preferably less than 50 µm, and most preferably less than 20 µm in thick glasses.

The modifications 8 are arranged with a horizontal spacing 31 and a vertical spacing 32 to each other. The vertical spacing 32 of the modifications 8 along a line 18 ranges from 1 µm to 100 µm. Since the modifications are the result of interference of the two partial beams 41 and 42, the vertical spacing 32 of the modifications 8, i.e. the density of the modifications 8 along line 18 can be defined by adjusting the energy ratios between the zero and first order interference areas. If the first order intensity is increased compared to the zero order intensity, the vertical spacing 32 decreases. This results in a filamentary modification channel that can be opened by etching the material. The centers of the modifications 8 have a vertical center distance 33. The diameter of the modifications is in a range from 0.2 µm to 5 µm. The diameter refers to the channels themselves. The stress zones around the channels may extend further into the material.

Overall, a regular pattern of material compression areas and depletion areas is produced in the material of the workpiece, with tension zones overlapping in such a way and being so strong that cracks spread along the plane of the workpiece and allow for later breaking along the plane.

Instead of producing linear parallel modifications, the method of the invention may also be used to produce inner cutouts with regular or irregular contours in sheet-like substrates. This may be achieved with or without producing auxiliary cuts.

Furthermore, the method of the invention can be used for inline severing beads of float glass, downdraw glass and overflow fusion glass, in the cold and hot zones (glass temperature T<annealing point). In the case of downdraw glass and float glass it is possible to treat glasses with a larger thickness. Changes in the width of the glass ribbon are compensated by mounting the optical system that modifies the laser beam on a displaceable bridge, as a unit. This is possible due to the fact that an arbitrarily long dashed focus can be generated. A change in thickness can therefore be compensated for alone by the length of the focus, without tracking or readjustment, provided the focus is longer than the thickness of the downdraw glass, overflow fusion glass, or float glass.

The severing of the beads or cutting to size of the ribbon in the longitudinal section may also be effected in a roll-to-roll process. The glass ribbon may also have coatings, such as protective coatings.

Figure 3:
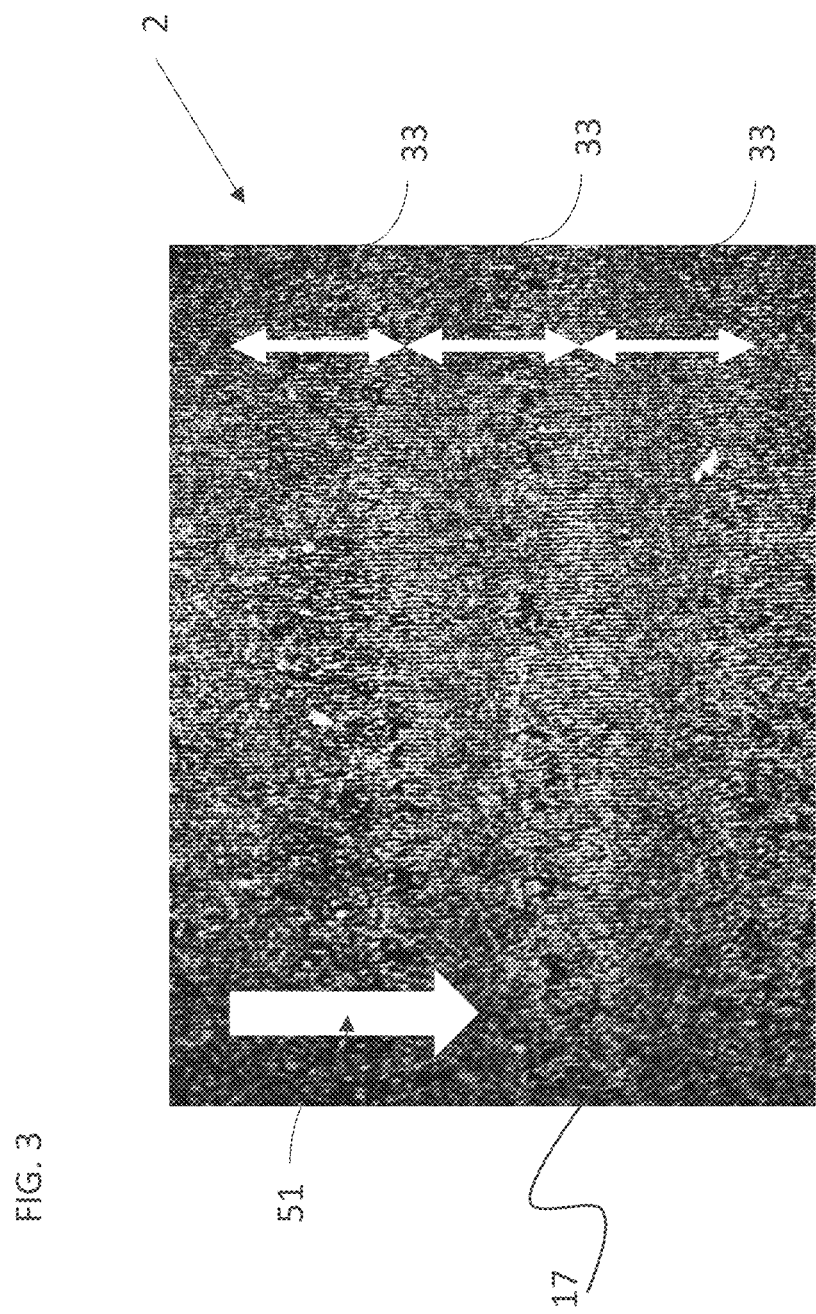
FIG. 3 shows a microscopic image of the fracture edge produced in the material of the workpiece along the modification in the case of single-pulse irradiation.

The modifications 8 are shown in FIG. 3 in a microscopic image of the workpiece 2, with the partial beams being irradiated from above here, in the direction of incidence 51 of the dashed focus. The modifications produced in the material of the workpiece 2 again have a vertical center distance 33 which is 160 μm in the example shown.

In the figures described below, the direction of incidence of the partial beams 41, 42 is always denoted by z, which corresponds to the direction of incidence 51 of the dashed focus in FIG. 3.

FIG. 3 shows a fracture surface or fracture edge 17 exhibiting lines of material modifications lined up one after the other in a chain-like pattern next to one another, with a center distance along the lines from 1 to 100 μm and a diameter from 0.2 μm to 5 μm, and each one surrounded by a compression zone 16.

FIG. 4a schematically shows the extent of the modifications 8 in beam direction z. A plurality of compression zones or interference zones 16 with modifications 8 are shown, which are arranged with a vertical spacing 32 or at a vertical center distance 33. The modifications 8 form a line 18 along which the workpiece 2 can be separated by mechanical breaking.

The same pattern is shown in FIG. 4b in a plan view along the z-axis, that is along the direction of incidence of the partial beams. Three compression zones 16 with material modifications 8 are shown, which are arranged with a horizontal spacing 31 to one another.

FIG. 5a shows the profile of the two partial beams 41 and 42 as generated by the optical system (not shown here) in the beam direction z. Partial beam 42 is a central beam with a diameter 65. Partial beam 41 is a ring beam with a diameter 63.

As shown in FIG. 5b in a side view, the partial beams 41 and 42 interfere in an interference area 43 having a length 66. The ring-shaped partial beam 41 has an opening angle 64 which depends on the geometry of the optical system (not shown here). Ring-shaped partial beam 41 is a Bessel beam or a Bessel-Gaussian beam.

FIG. 6 shows the beam path of FIG. 5b inside the material of a workpiece 2. Partial beam 42 with diameter 65 runs centrally through the material, as a central beam. In an interference area 45, partial beam 42 interferes with ring-shaped partial beam 41 that has a diameter 63. The desired modifications are produced within the interference area 43 in the material of the workpiece 2.

Without being limited to a special configuration of the optical system, the laser light is particularly preferably split up in such a way that the two partial beams, i.e. in particular the ring beam and the central beam, have comparable intensities. Comparable intensities is understood to mean that the intensities differ by no more than a factor of 5, preferably by no more than a factor of 3, most preferably by no more than a factor of 1.5. In this way, a strong intensity variation is achieved in the interference pattern of the partial beams that are superimposed inside the workpiece.

In order to produce the Bessel beam, a ring beam is formed into the partial beam 41, for example by means of an axicon, which ring beam then forms a line-shaped Bessel focus, which in turn is caused to interfere with a central beam, i.e. the second partial beam 42, in the elongated interference area 43. The length L (66) of interference area 43 is defined by the diameter $D_r$ of the ring beam and its opening angle 2α (reference numeral 64): $L=D_r/\tan α$.

FIG. 6 shows how the beam properties change when focused in the material of the substrate 1 to be structured, which has a refractive index n.

Essentially, the opening angle α' in the material (reference numeral 71) is smaller than the opening angle α in air, according to the law of refraction:

$$\sin α = n \sin α'.$$

| | |
|---|---|
| Half opening angle in air | 9.7° |
| Half opening angle in the material | 6.7° |
| Laser wavelength | 1064 nm |
| Longitudinal periodicity | 157 μm |

The situation of FIG. 6 is shown in FIG. 7 as an intensity distribution in a longitudinal section through the laser beam. Intensity maxima 45 are lined up one behind the other in the beam direction z, as caused by the interference of the Bessel-Gauss beam 41 and the central beam 42. The intensity maxima 45 of the interference areas 43 are at a distance 33 from each other.

The periodicity of distance 33 of the intensity maxima as produced by the interference is determined by the central wavelength λ of the beam source and the opening angle of the ring beam 2α according to $P=2λ/\sin^2 α$.

According to a preferred embodiment of the invention, the interference zone is formed in such a way, by suitable choice of the laser wavelength and the beam parameters of the partial beams 41, 42 (in particular the opening angle), that the quotient ω of the sum of individual lengths $l_i$ of all modifications i, measured in the beam direction and the thickness d of the substrate is greater than 0.5 according to a preferred embodiment, preferably 0.7, most preferably >0.9.

According to one embodiment of the invention, the workpiece 2 according to the invention therefore has material modifications 17 along a line 18, for which the following applies:

$$\omega = \frac{\sum_{i=1}^{n} l_i}{d} \geq k,$$

with k=0.5, preferably k=0.7, more preferably k=0.9, most preferably k=0.95.

FIG. 8 shows a first embodiment of the optical system 6, comprising a plano-convex axicon 91. A laser beam with a diameter 48 is incident on the planar side 95 of the axicon 91 and is thereby split into a ring-shaped partial beam 41 with a diameter 63 and a central partial beam 42 with a diameter 65. The convex side 96 of the axicon has the shape of a truncated cone. The two partial beams 41 and 42 interfere in an interference area 43. As shown in FIG. 7, the interference area 43 repeats itself periodically along the optical axis of the axicon 91. Location and extent of these interference areas 43 can be controlled by changing the geometric parameters of the axicon. These geometric parameters include the inclination of the side lines and the height of the truncated cone of the axicon 91 defining the convex side 96.

The ratio of beam width 48 to the width of the planar truncated face determines the power ratio of the two partial beams 41 and 42. This ratio can preferably be selected such that the partial beams preferably have a similar power as far as possible. For example, in one embodiment of the invention, the ratio of beam width 48 to planar truncated face can be selected such that the power ratio of the partial beams 41, 42 ranges from 0.75 to 1.25. This ratio can be predetermined by the shape and arrangement of the involved optical components, in particular by the shape of the truncated side of the axicon.

In the embodiment of optical system 6 according to FIG. 9, the plano-convex axicon 91 is arranged in the beam path such that the convex side 95 faces the incident beam and the planar side 96 faces the direction opposite to the direction of incidence of the laser beam. With this arrangement of the axicon 91, the incident laser beam is again split into two partial beams 41 and 42, which interfere in an interference area 43 which is closer to the axicon 91 in the arrangement of FIG. 9 than in the case of the arrangement according to FIG. 8.

Figure 10:
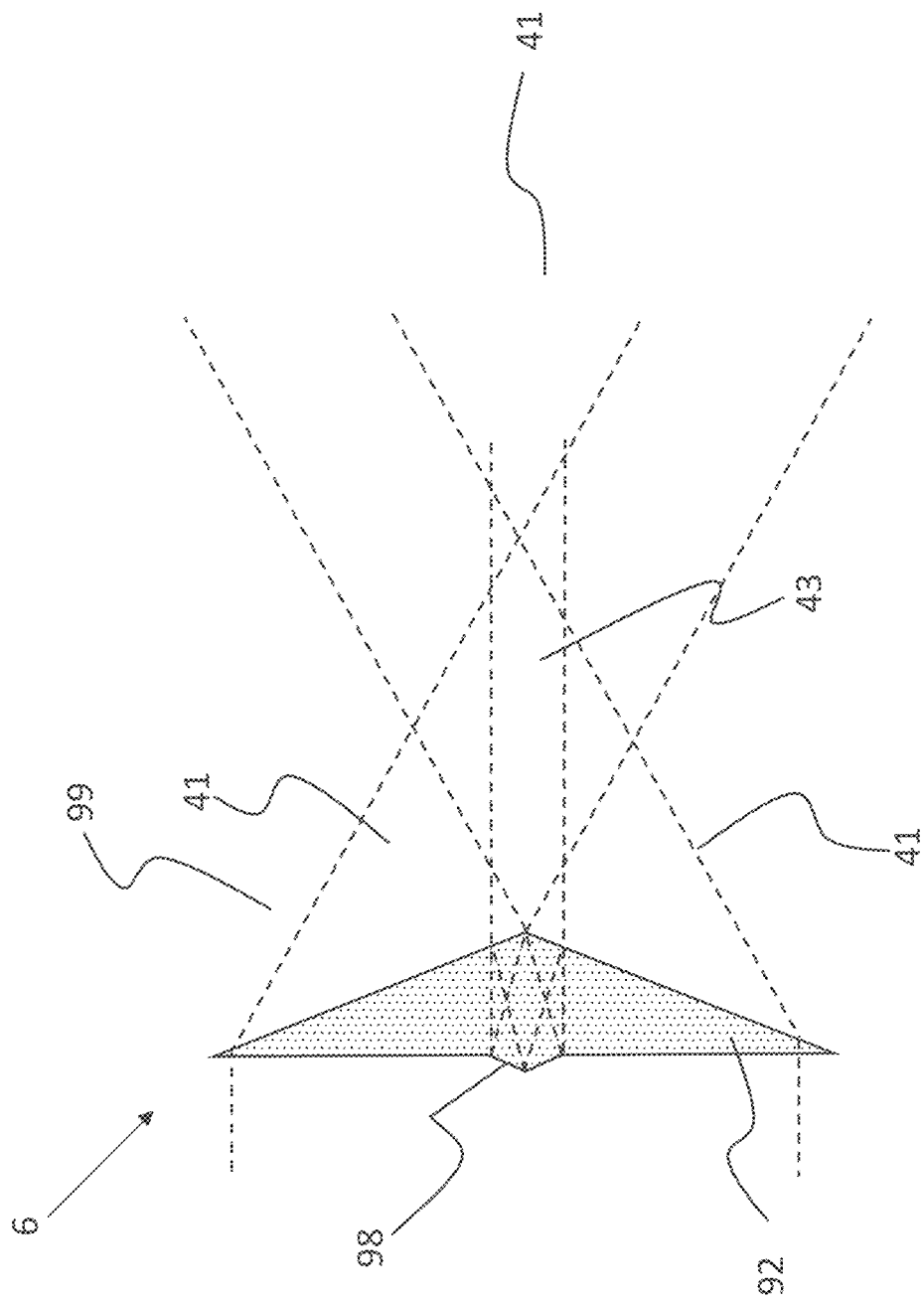
FIG. 10 shows a further embodiment of the axicon.

In the embodiment of optical system 6 according to FIG. 10, a plano-convex axicon 92 is used, which has a convex side 99 with the shape of a cone. On the planar side 100 of the axicon 92, a glass cone 98 is centered. The convex side 99, again, generates a ring-shaped partial beam 41. The conical structure 98 on the planar side 100 causes generation of two central beams 104a and 104b which run parallel to one another and parallel to the optical axis. The two central beams 104a and 104b interfere with the partial beam 41 in two interference areas 105a and 105b which likewise extend parallel to the optical axis. The interference areas 105a and 105b are repeated periodically along the further beam path.

Figure 11:
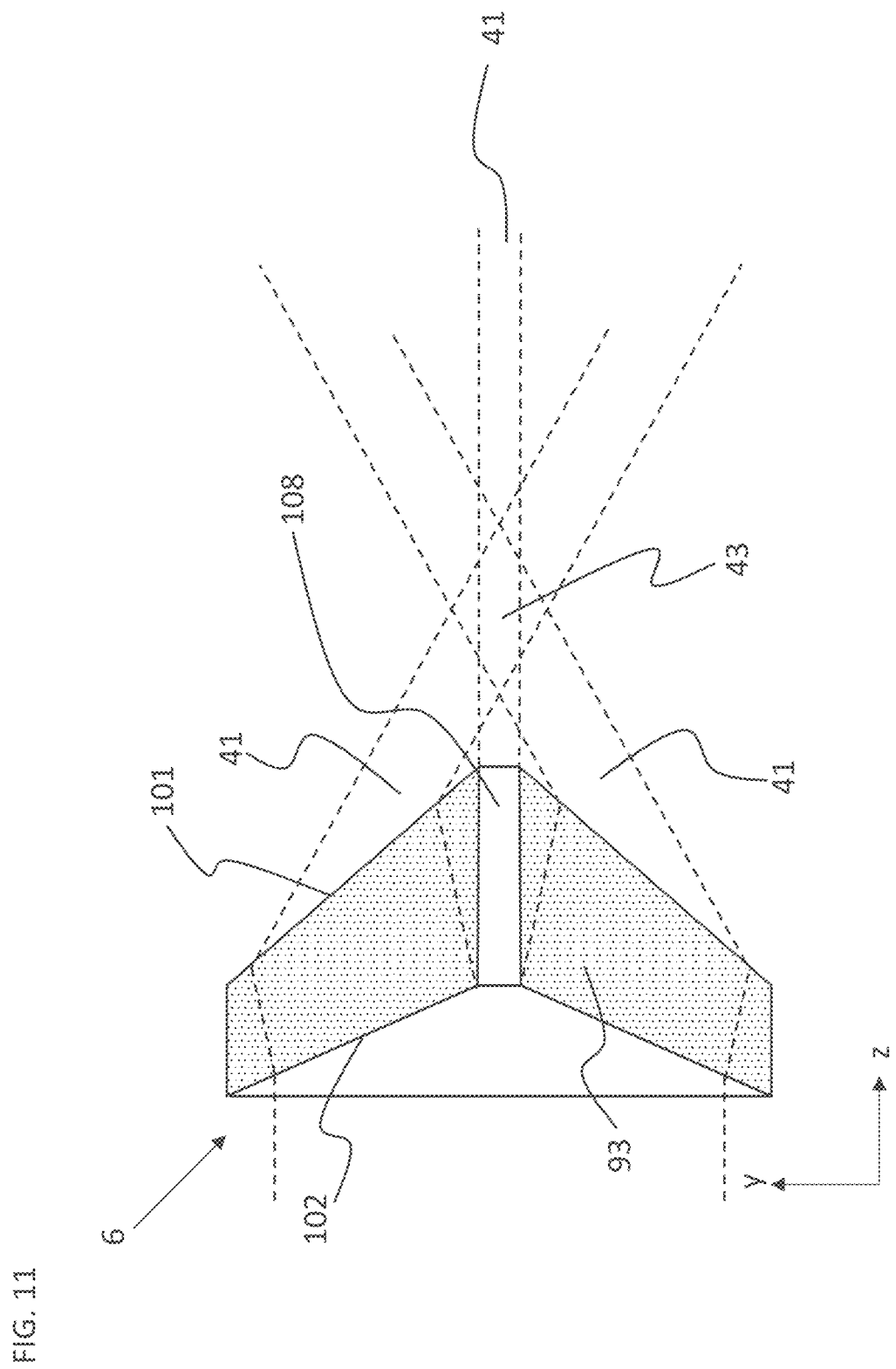
FIG. 11 shows the beam paths when using of a convex-concave axicon.

A convex-concave axicon 93 is used in the embodiment of optical system 6 according to FIG. 11. Again, the convex side 101 has the shape of a truncated cone. The contour of the concave side 102 has the shape of a truncated cone. The axicon 93 has a central area 103 filled with air, through which the incident laser beam passes unaffected and forms the central partial beam 42. In this embodiment the axicon 93 again generates a ring-shaped partial beam 41 which interferes with the central beam 42 in an interference area 43. The interference area 43 is repeated periodically along the further beam path.

Figure 12:
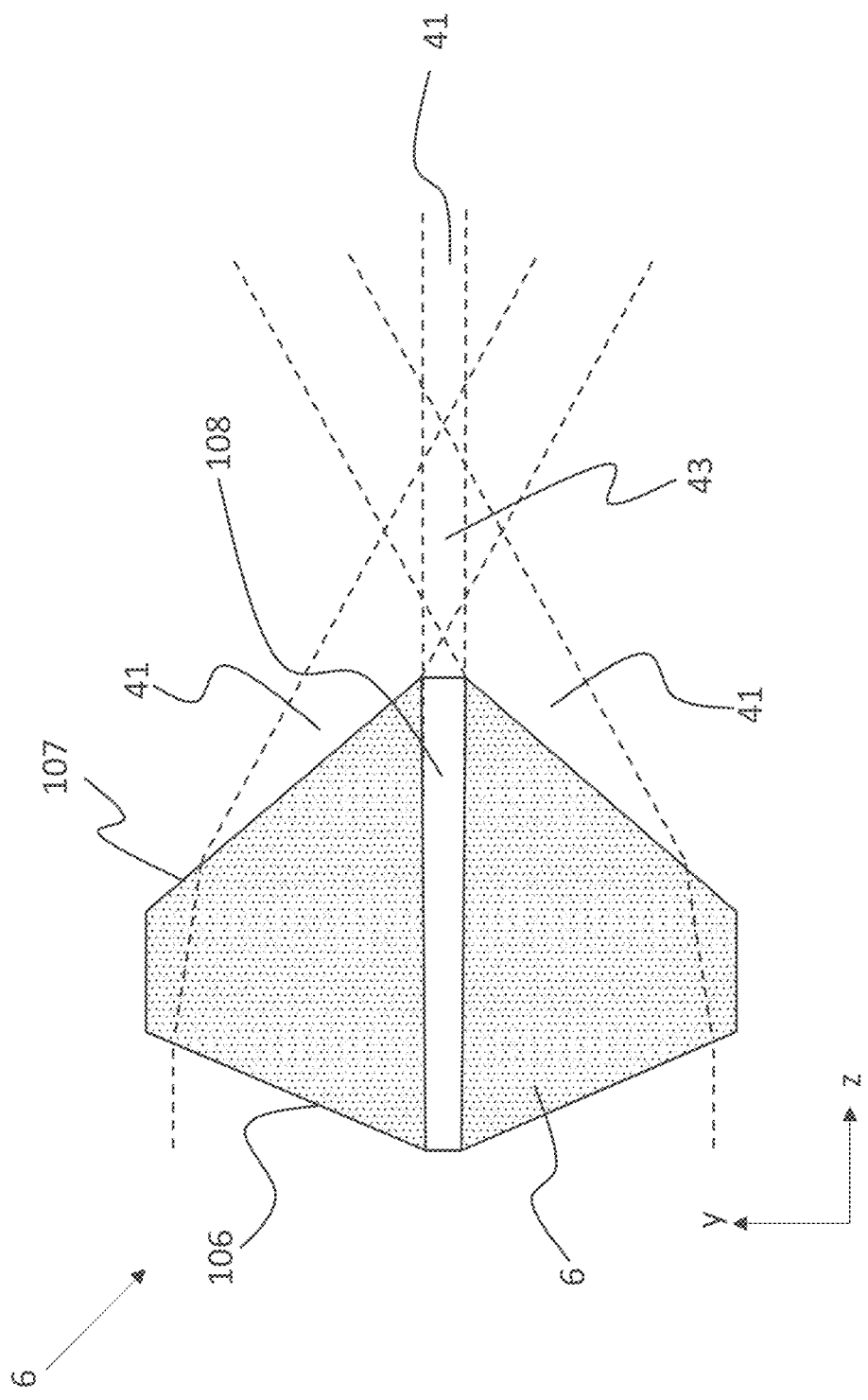
FIG. 12 shows the beam paths when using a biconvex axicon.

In the embodiment of optical system 6 according to FIG. 12, a biconvex axicon 94 is used, which has a first convex side 106 and a second convex side 107. The two convex sides 106 and 107 each have the shape of truncated cones, but have different angles of inclination of the side surfaces. Furthermore, a central opening 108 is provided, which allows the incident laser beam to pass through unaffected and thus generates the central partial beam 42. Partial beam 42 interferes with ring-shaped partial beam 41 in an interference area 43. The interference area 43 is repeated periodically along the further beam path.

Figure 13:
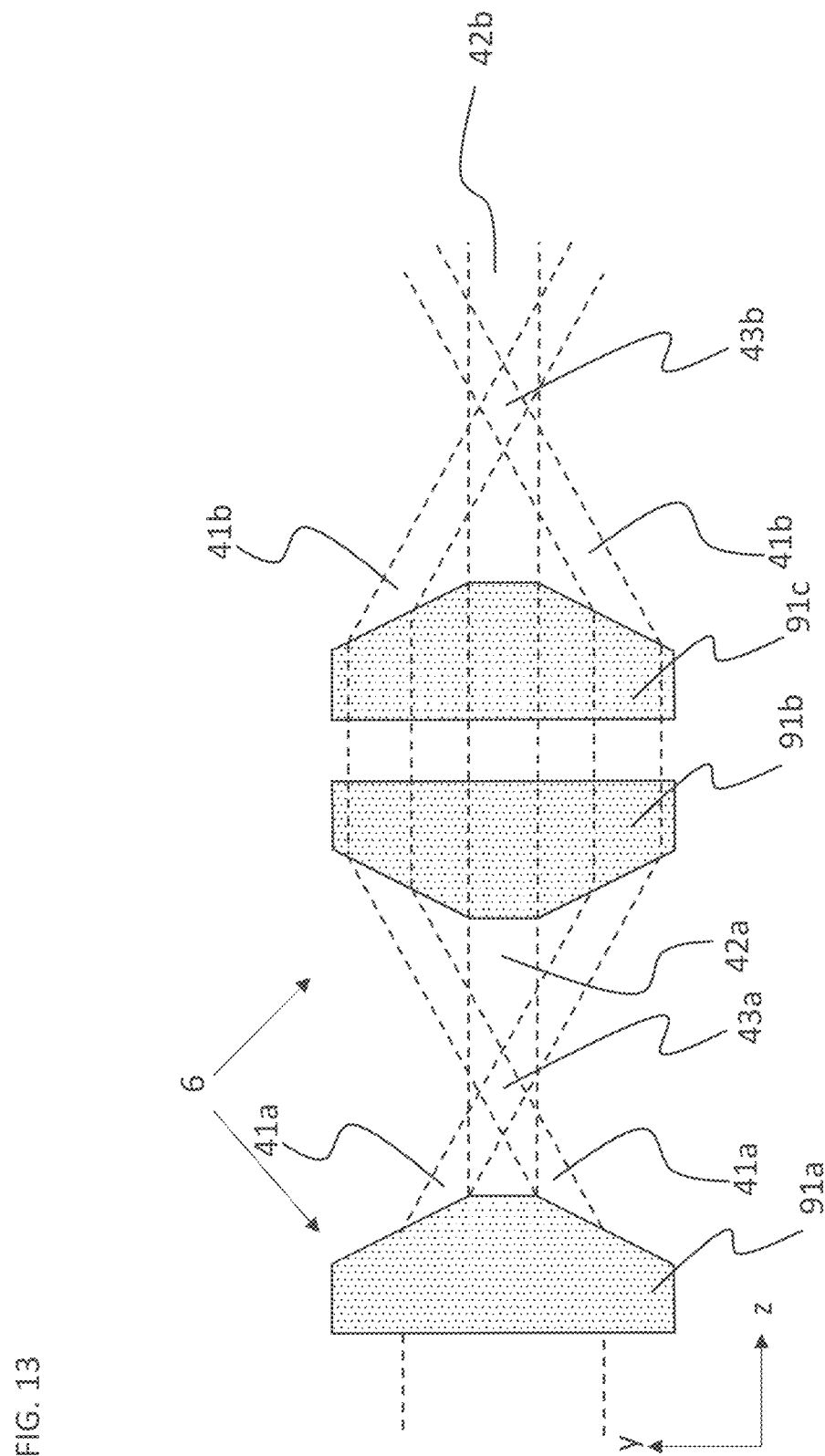
FIG. 13 shows the beam paths when using three plano-convex axicons.

For the embodiment of optical system 6 according to FIG. 13, a first axicon 91a, a second axicon 91b, and a third axicon 91c are employed. The planar side of first axicon 91a faces the incident beam and generates a ring-shaped partial beam 41a and a central beam 42a which overlap in an interference area 43a, similarly to the embodiment shown in FIG. 8. The second axicon 91b faces the incident beam with its convex side and converts the two partial beams 41a and 42a into parallel beams that emerge from the planar side of the second axicon 91b and then are incident on the planar side of the third axicon 91c by which they are transformed into a partial beam 41b and a central partial beam 42b. Partial beams 42b and 41b interfere in an interference area 43b which is located inside the workpiece to be processed. Interference area 43b is repeated periodically along the further beam path.

Figure 14:
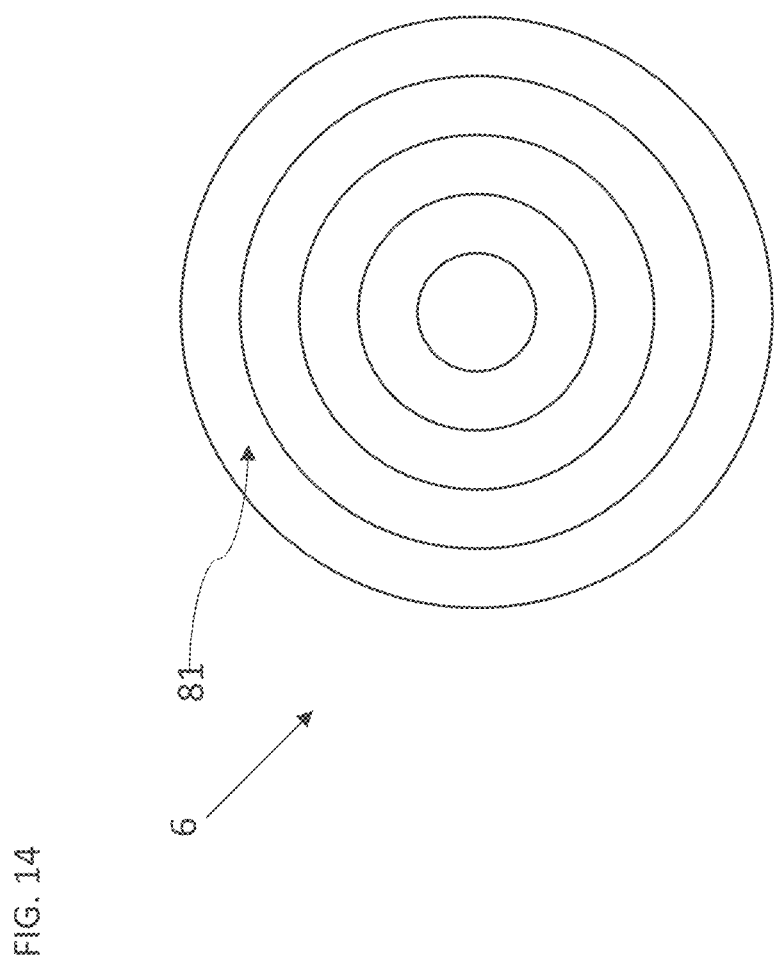
FIG. 14 shows a front view of an axicon in the form of a concentric ring grating.

In the embodiment of optical system 6 according to FIG. 14, the axicon is in the form of a concentric ring grating. This means that the axicon comprises a glass body 81 representing a phase mask, which includes trenches with a trench height 82, as illustrated by FIG. 16 in a vertical sectional side view.

In a front view of the glass body 81 as seen in the beam direction, the highest points of the trenches appear as concentric rings (FIG. 14). FIG. 15 shows the beam path when using a glass body 81 in the form of a concentric ring grating. A laser beam with a diameter 48 is incident on the grating and is split into partial beams 41 and 42. Partial beam 42 has the diameter 47, which means that it encompasses essentially the entire diameter of the glass body 81 or of the axicon in the form of a ring grating. Partial beams 41 and 42 emerge on the planar side of 81 and interfere in an interference area 43 which is repeated periodically along the beam direction in the material of the workpiece to be processed.

Figure 17:
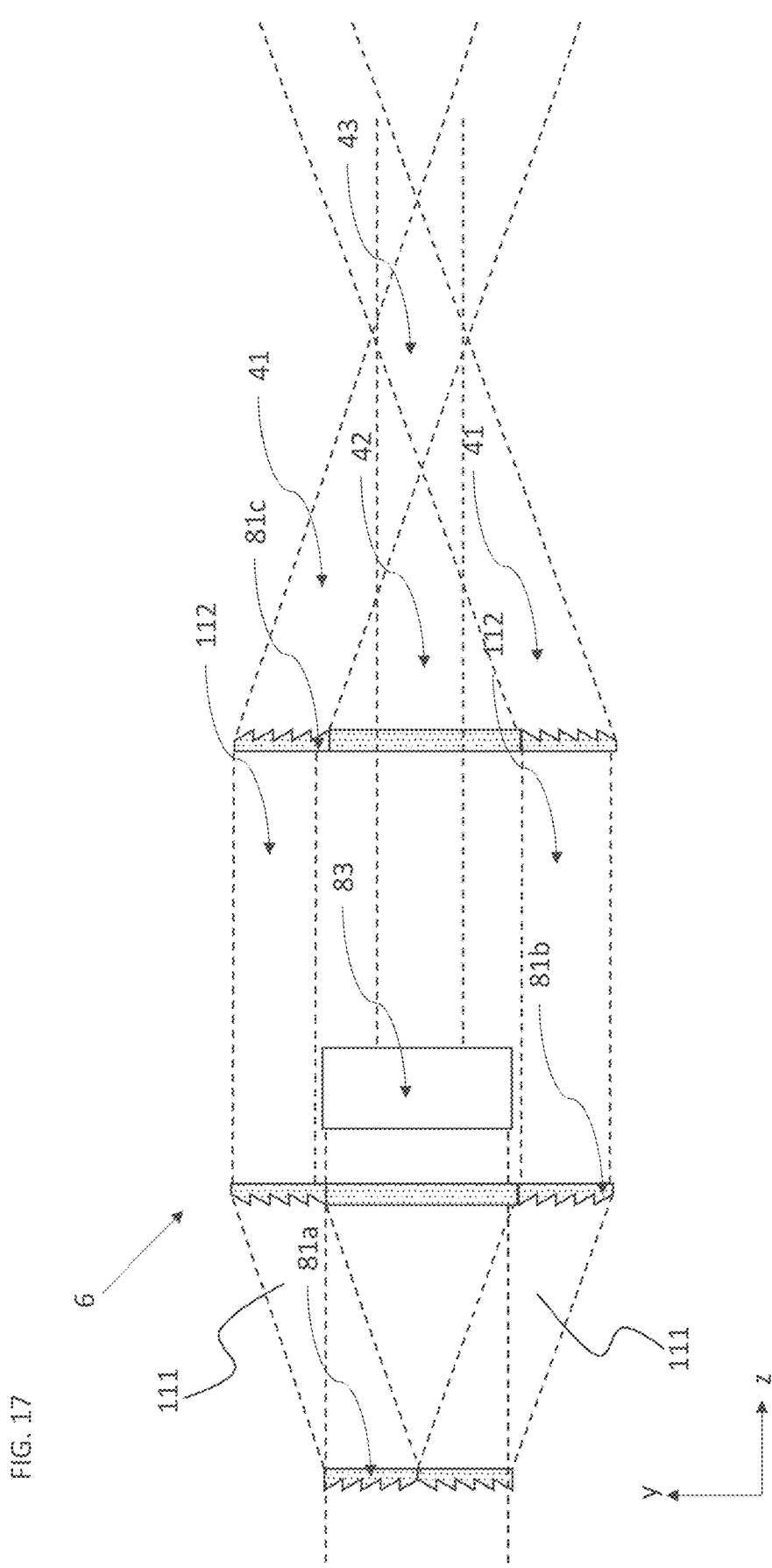
FIG. 17 shows the beam paths when using a negative axicon and two positive axicons in the form of concentric ring gratings.

For the embodiment of optical system 6 according to FIG. 17, three axicons or glass bodies in the form of concentric ring gratings are employed, a first glass body 81a, a second glass body 81b, and a third glass body 81c. Both the second 81b and the third glass body 81c each have a central area, 110a and 110b, respectively, provided in the center thereof. Below and above these central areas 110a and 110b, the glass bodies 81b and 81c are in the form of concentric ring gratings.

The incident laser beam first impinges on the first axicon 81a by which it is converted into a ring-shaped beam 111 that extends obliquely to the optical axis. The second axicon 81b converts the beam 111 into a tubular partial beam 112, which in turn is converted into a partial beam 41 by the third axicon or glass body 81c. For further shaping the central partial beam 42, a beam converter 83 is arranged between the second glass body 81b and the third glass body 81c. Beam converter 83 may, for example, be a telescope or a beam attenuator. As in the previously described embodiments of the optical system 6, partial beams 41 and 42 interfere in an interference area 43 which is repeated periodically along the further beam path.

The device described above by way of various embodiments of the optical system 6 is used to perform a method for preparing a workpiece 2 for separation. Once a workpiece 2 has been provided, which is transparent to the light of a pulsed laser beam, the laser beam is split into at least two partial beams 41, 42 by the optical system 6. Both partial beams 41, 42 are directed onto the workpiece 2 in such a way that the partial beams 41 and 42 are incident on the workpiece 2 at different angles to the normal of the irradiated surface 21 and are superimposed in the interior of the workpiece 2. The partial beams 41, 42 overlap or interfere with one another in such a way that a sequence of intensity maxima 45 is formed inside the workpiece 2, which are lined up one after the other along the overlapping area 43 of the partial beams 41, 42. The intensity at the intensity maxima 45 is sufficiently high to modify the material of the workpiece 2 so that a chain-like periodic pattern 9 of material modifications 8 is produced, while the workpiece 2 and the partial beams 41, 42 are moved relative to one another such that a multitude of chain-like periodic patterns 9 of material modifications 8 are produced along a path defining a separation line 11. In a later step, the workpiece 2 can be divided into multiple pieces by mechanical breaking along the separation line 11.

The exemplary embodiments of FIGS. 5, 6, 8-13, and 17 have in common that a conical beam or Bessel-type beam is caused to interfere, as a partial beam, and to form a focus that is extended and periodically modulated in the beam direction thus forming an elongated linear periodically interrupted modification zone. Although other beam shapes would be conceivable, this is also the particularly preferred embodiment of the invention. Accordingly, more generally and without being limited to the exemplary embodiments, it is contemplated according to a preferred embodiment of the invention that one of the partial beams 41 is a beam generated using an axicon, or a Bessel beam, and that the second partial beam 42 is superimposed with the first partial beam in the region in which the first partial beam forms a line focus.

The aforementioned exemplary embodiments furthermore have in common that the second partial beam is a parallel beam. According to a further preferred embodiment it is therefore furthermore contemplated that the second partial beam 42 is shaped as a parallel beam. Other variants are also conceivable in this respect. For example, two axicons with different tip angles could generate the partial beams. In this case, two Bessel-like beams or two conical beams having different convergence angles would be caused to interfere. As can also be seen from the figures, partial beams 41, 42 that are collinear to one another are generally preferred according to a further embodiment of the invention.

Figure 18:
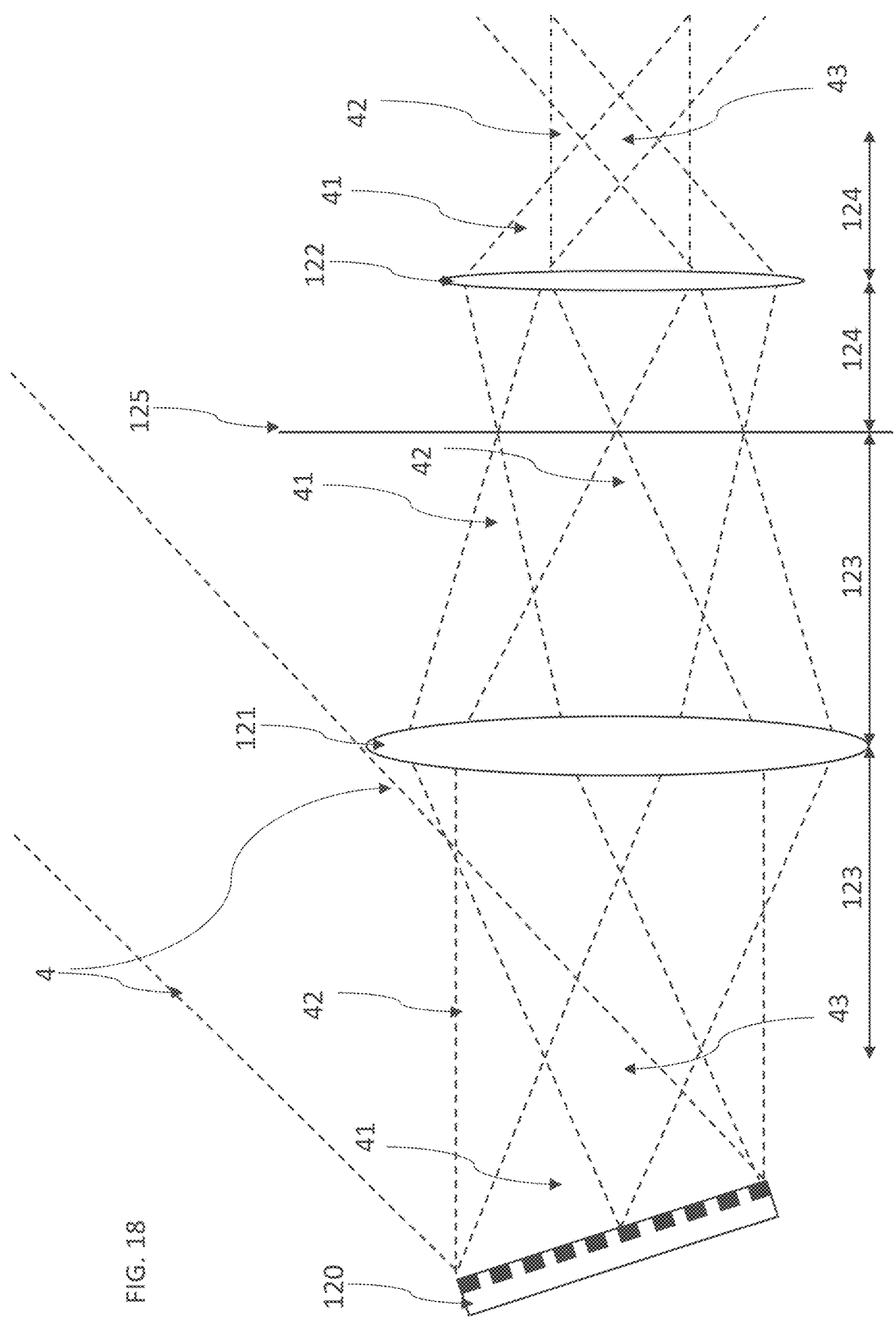
FIG. 18 shows a further exemplary embodiment involving a phase mask with a lens system arranged downstream thereof.

FIG. 18 shows a further exemplary embodiment, in which the laser beam that is incident from the left in the drawing is incident on a component 120 which—without limiting generality—is in the form of a reflective grating or phase mask, that is, more generally, in the form of a diffractive optical element. A corresponding transmission arrangement is also possible. The partial beams 41, 42 of the $0^{th}$ and $+/-1^{st}$ order emanating from the component 120 are superimposed in interference areas 43 by the downstream two-lens system, here arranged as a 4f setup. The lens system comprises an imaging lens 121 with a focal length 123 and an objective lens 122 with a focal length 124. The Fourier plane 125 of the 4f setup is located downstream of imaging lens 121 at the distance of focal length 123. More generally, without being limited to the illustrated example, it is contemplated according to one embodiment of the invention that the optical system 6 comprises a diffractive element which splits the laser beam into multiple (two or more than two) partial beams defined by different diffraction orders which may also include the $0^{th}$ diffraction order, and that the optical system is furthermore configured so that the partial beams are caused to be superimposed within the workpiece.

Figures 19, 20:
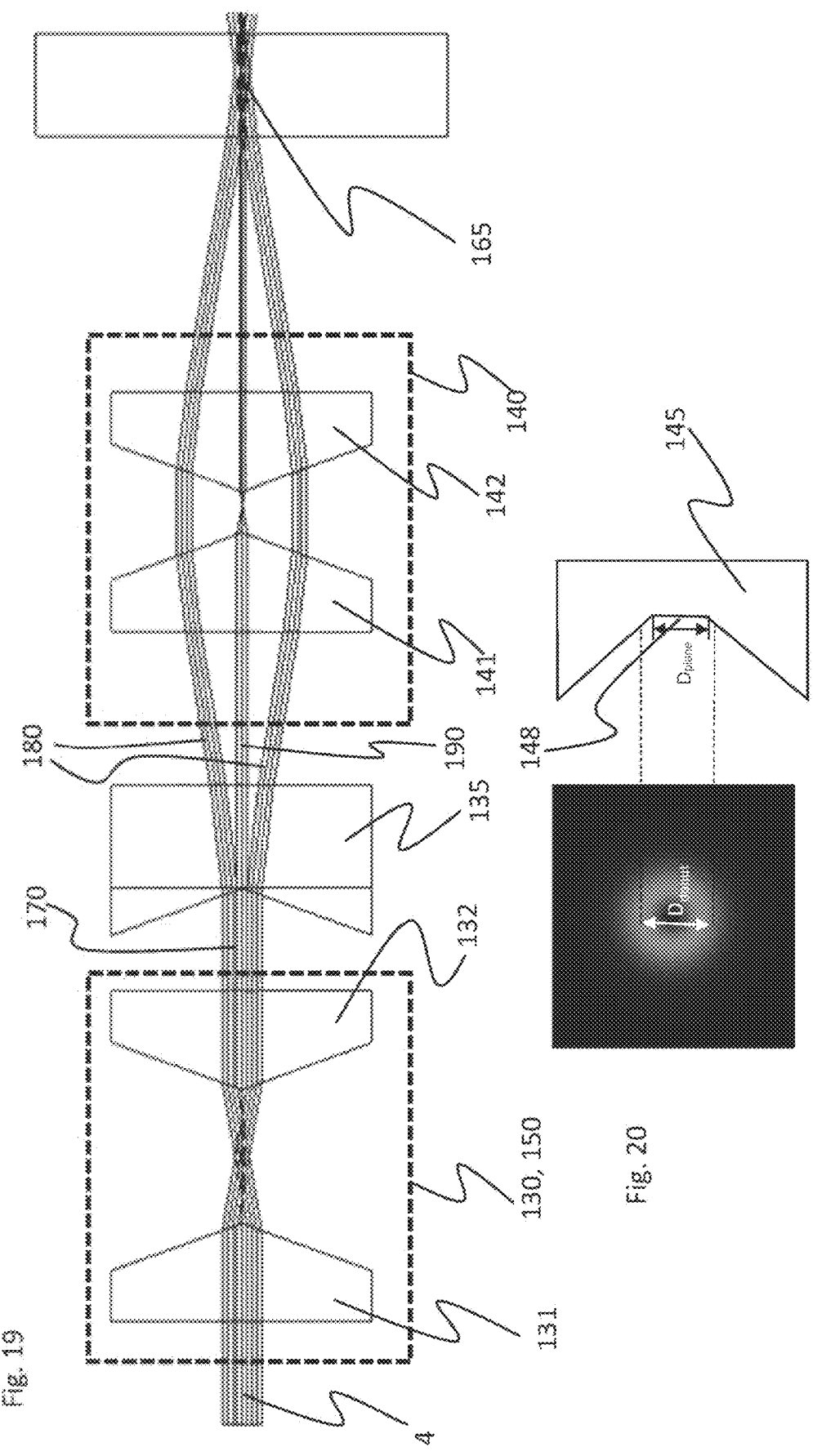
FIG. 19 shows an embodiment involving the generation of a ring beam which is then used to generate the dashed focus.
FIG. 20 shows a projection of a ring beam onto the transition area between an oblique wedge surface and the roof face of a truncated contour of an axicon.

In a further embodiment (FIG. 19), the intensity of the incoming Gaussian beam 4 is initially transformed to form a donut or ring beam 170 by a suitable arrangement of two plano-convex axicons 131 and 132 (first axicon arrangement 130: the convex side or roof surfaces of the axicons 131 and 132 face each other). Donut or ring beam 170 refers to a beam with a beam profile that exhibits infinitesimal intensity on the beam axis, but has at least one intensity maximum along a circular ring around the beam axis. The diameter of the annular intensity maximum is determined by the mutual spacing of the two axicons 131, 132 in this axicon arrangement 130 and/or by the spacing of the two axicons 131, 132 from one another. The donut beam 170 is incident on a further optical element, preferably an inverse axicon 135 with a truncated tip or a cemented combination of a plano-parallel plate and an inverse truncated axicon (third axicon 135), whereby it is split into a ring-shaped and divergent partial beam 180 and a non-deflected central beam 190. The divergent ring beam 180 is now first parallelized and then re-converged onto the optical axis with the non-deflected central beam, by a second axicon arrangement 140 (comprising two plano-convex axicons 141 and 142 spaced apart from one another). The position of the overlap volume, i.e. interference volume, is determined by the position of the last axicon 142 of the second axicon arrangement 140. The periodicity of the dashed focus 165 within the interference volume results from the convergence angle of the ring beam, analogously to what was mentioned above. The power fractions of the central beam 190 and the ring beam 180 can be predetermined by the ratio of the truncated cone surface area of the axicon 135 to the diameter of the beam incident on the axicon 135 (FIG. 20). As a matter of course, the two axicons 141, 142 of the second axicon arrangement 140 may be replaced by truncated axicons, which will generally lead to a further improvement in beam quality.

FIG. 20 shows an example of a possible intensity distribution of the donut beam 170 at the exit of the first axicon arrangement 130 and the projection of its beam area and power onto the concave side of truncated axicon 145 as shown on the right in FIG. 20. The larger the fraction of the beam passing through the central truncated face 148 of the axicon 145, the greater will be the intensity in the central beam 190 and thus the more intense will be the manifestation, i.e. the contrast ratio, of the dashed focus line. If the inner diameter of the incident ring beam 180, i.e. the free diameter, is larger than the diameter $D_{plane}$ of the truncated roof surface of the concave conical contour, a linear and non-interrupted focus of the Bessel beam as known from the prior art will be formed within the interference volume.

A further embodiment is resulting (FIG. 21) if each of the axicons 131, 132, preferably made of glass, of the first axicon arrangement 130 of FIG. 19 is replaced by a respective diffractive axicon, a ring grating, or a spiral phase plate 151 or 152 (e.g. as described in U.S. Pat. No. 8,335,034 B2). The two spiral phase plates 151, 152 form an arrangement 150 for generating a donut beam. The first axicon arrangement 130 of the embodiment shown in FIG. 19 likewise represents such an arrangement 150 for generating a donut beam. When using spiral phase plates, it should preferably be ensured that the direction of rotation of the spiral phase plates 151, 152 is oriented opposite to one another to allow the second spiral phase plate 152 to parallelize the ring beam 180 generated by the first spiral phase plate 151.

Figure 21:
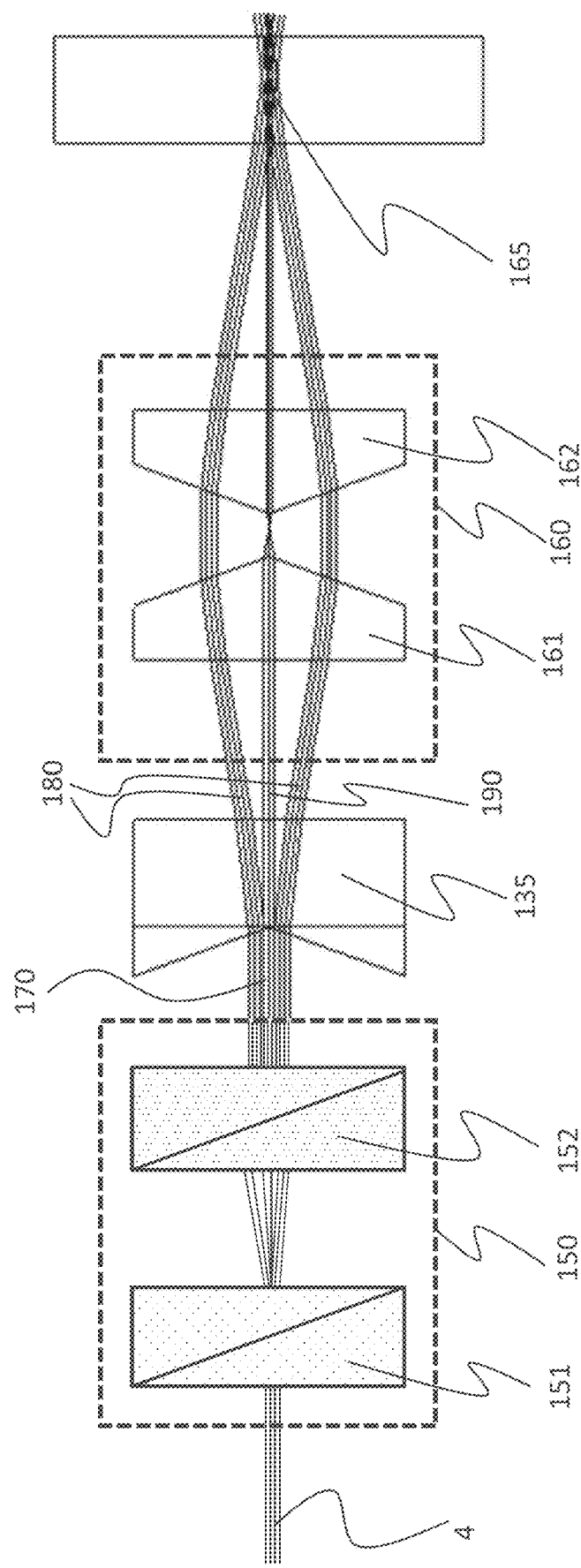
FIG. 21 shows a further exemplary embodiment involving the generation of a ring beam which is then used to generate a dashed focus.

The examples of FIGS. 19 and 21 have in common the arrangement 150 for generating the donut beam in combination with a frustoconical axicon 135 which allows to adjust the intensity of the partial beams that are caused to interfere. Accordingly, it is contemplated according to one embodiment that the device for preparing a workpiece 2 for separation comprises an arrangement 150 for generating a donut or ring beam 170 with a beam profile that has an infinitesimal intensity on the beam axis while having an intensity maximum on a circular ring around the beam axis, and a frustoconical axicon arranged downstream of this arrangement 150 in the beam direction, which splits the ring beam 170 into a central beam 190 and a ring beam, wherein power fractions of the central beam 190 and the ring beam 180 are adjustable through the ratio of the frustoconical surface of the axicon 135 to the beam diameter of the ring beam 170 incident on the axicon.

The exemplary embodiments of FIGS. 19 and 21 furthermore have in common the triplet of axicons 135, 141, 142, by which a divergent ring beam 180 is first generated, then deflected into an axially parallel beam by axicon 141, and then focused by the last axicon 142 so as to re-converge with the non-deflected central beam on the optical axis. Accordingly, without being limited to the specific examples, yet another embodiment of the invention contemplates that the optical system 6 comprises an axicon triplet consisting of three axicons 135, 141, 142 arranged one behind the other, wherein the first axicon 135 as seen in the beam direction generates a divergent ring beam which is parallelized by the subsequent axicon 141 and is converted into a converging ring beam by the last axicon 142 of the axicon triplet. The central, non-deflected beam may also be passed through openings in the axicons. Furthermore, the first axicon 135 of the triplet need not necessarily be an inverse axicon. It is also possible to use a convex axicon and to generate the divergent beam after passing through an intermediate focus.

In order to be able to estimate the influence of the individual optical components on the intensity distribution in the focus, the 10 ps pulse (4 pulses per burst) of a Pharos UKP laser (1030 nm, 100 kHz repetition rate) with a mean beam power of 100 mW is successively imaged, in variant 1 initially only by one axicon, in variant 2 by a combination of two phase plates and one axicon, and in variant 3 by a combination of two phase plates and three axicons (in which case the middle axicon is an truncated axicon, as described above, and all axicons have a roof angle of 20°) and the intensity distribution in the focus is measured using a camera (e.g. of the Coherent Lasercam HR type) with a microscope lens fitted thereto, by continuously moving the camera through the focus area along the optical axis while recording the lateral intensity distribution of the laser beam in the focus. The video recorded in this way allows to determine the intensity distribution along the optical axis in the focus area, in relative units.

Figure 22B:
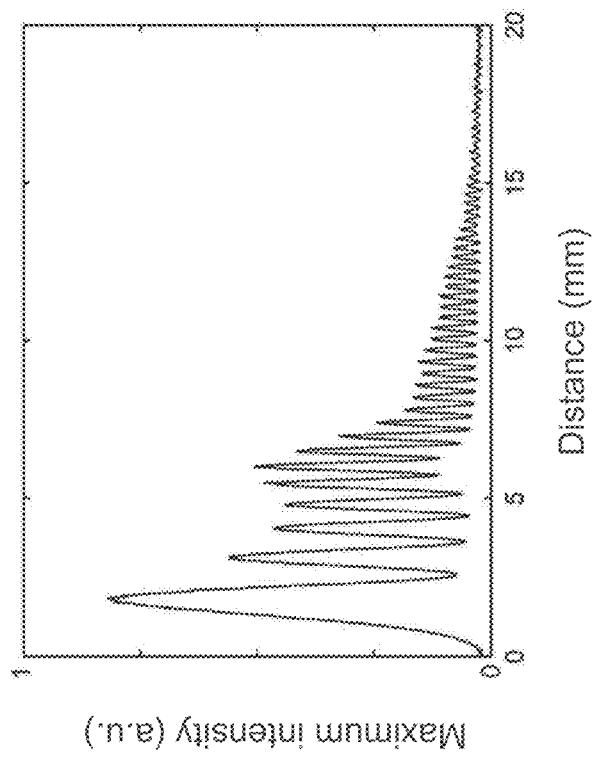
FIGS. 22a and 22b show the intensity distribution in the working volume along the optical axis for three different beam shaping arrangements, namely in a first variant with an axicon, in a second variant with phase plates and an axicon, and in a third variant with phase plates and an axicon triplet.
Figure 22A:
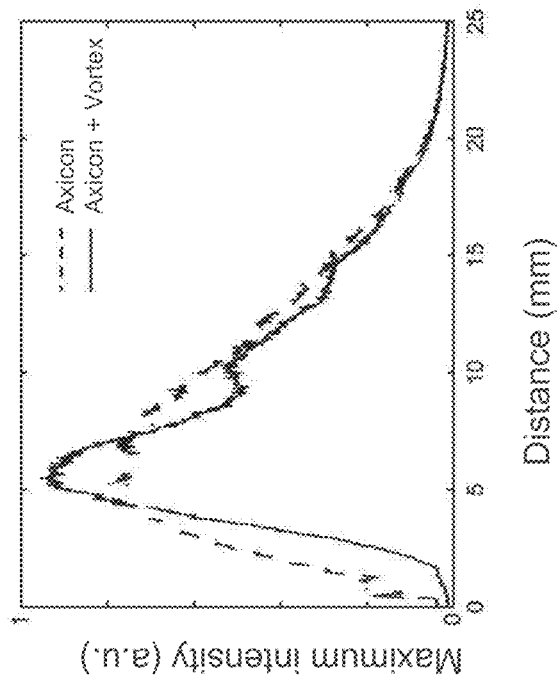

FIGS. 22a and 22b show the intensity distribution along the focal line measured in this way. FIG. 22a shows the intensity distributions of variant 1 (focusing of the incoming Gaussian beam using an axicon) and of variant 2 (transformation of the Gaussian beam into a ring beam with subsequent focusing by an axicon), which have a very similar profile in the longitudinal direction along the optical axis. FIG. 22b, on the other hand, shows the intensity distribution along the optical axis in the focus area when using variant 3 (imaging of the ring beam generated by the phase plate combination using three axicons, one of the axicons being a truncated axicon 135 and the two axicons 141 and 142 forming the second axicon arrangement 140): The envelope of the intensity distribution has similar features as variant 2 (steep rise of intensity on the side facing the optical system, significantly slower drop on the side facing away from the optical system), however it includes a multitude of periodically arranged intensity maxima and minima, with an intensity of the intensity minima close to zero.

Figure 23:
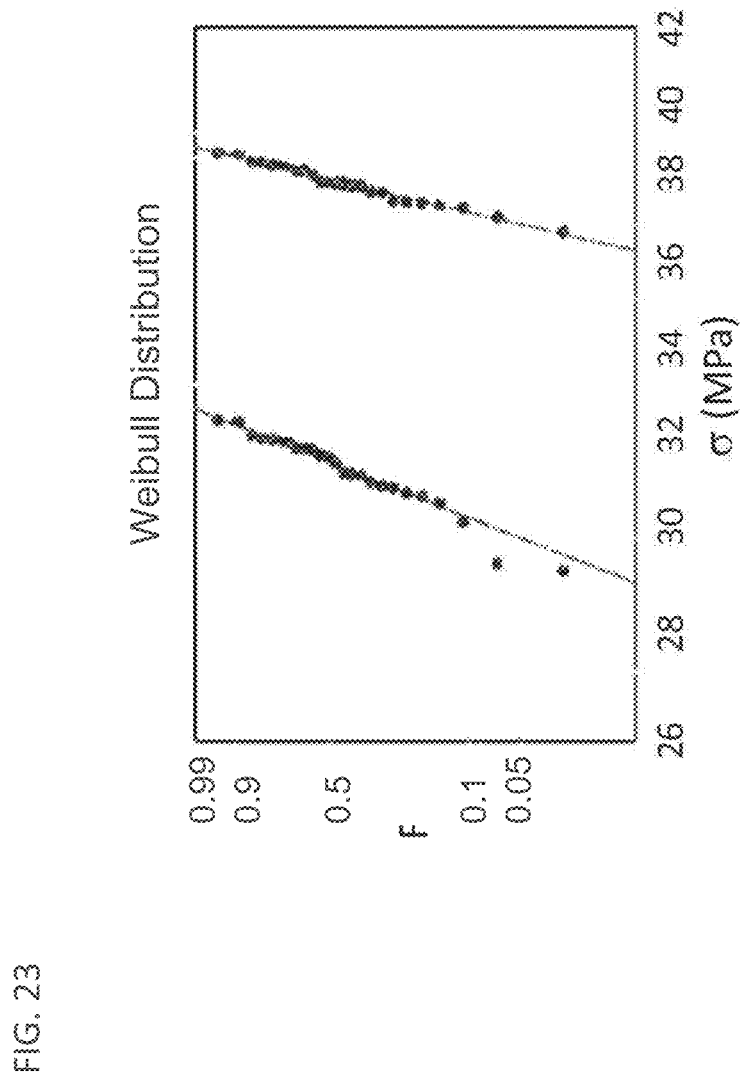
FIG. 23 shows Weibull distributions of breaking stresses of borosilicate glass processed with a Bessel beam, and with a ring beam-based dashed focus, respectively.

FIG. 23 shows the change in breaking stress distributions on borosilicate glass of 1 mm thickness, which were filamented according to variant 1 (i.e. using one axicon, right curve) or variant 3 (2 phase plates and axicon triplet to generate the dashed focus, left curve). To this end, material modifications with a pitch of 3.5 µm were introduced using the Pharos laser already mentioned above (1030 nm; repetition frequency 1 kHz; mean pulse power 980 mW; pulse duration 10 ps, bursts of 4 pulses). A significant reduction in breaking stresses is resulting: For a 95% probability of fracture, for example, the breaking stresses are approx. 15% lower in the case of material processing using a dashed focus than in the case of processing using the Bessel beam generated solely using an arrangement comprising axicons.

LIST OF REFERENCE NUMERALS

2 Workpiece
3 Laser
4 Laser beam
6 Optical system
8 Material modification
9 Periodic pattern of 8
11 Separation line
13 Positioning device
16 Compression zone
17 Fracture edge
18 Parallel lines
19 Plane with material modifications
41, 42 Partial beams
41a, 41b, 42a, 42b Partial beams when using multiple axicons
21 Surface of 2
22, 24 Surfaces of 2
31 Horizontal spacing of modifications
32 Vertical spacing of modifications
33 Vertical center distance of modifications
43 Overlap or interference area of 41, 42
43a, 43b Overlap or interference area when using multiple axicons
45 Intensity maximum
47 Diameter of 42
48 Diameter of laser beam
63 Diameter of 41
64 Opening angle of 41
66 Length of 45
51 Direction of incidence of dashed focus
71 Opening angle of 41 in the material of 2
81 Glass body of phase mask
81a, 81b, 81c Axicons in the form of concentric ring gratings
82 Trench height of phase mask
83 Beam converter
91 Plano-convex axicon
91a, 91b, 91c Plano-convex axicons when using multiple axicons 92 Plano-convex axicon with conical structure on the planar side
93 Convex-concave axicon
94 Biconvex axicon
95 Planar side of 91
96 Convex side of 91
98 Conical structure on the planar side of 97
99 Convex side of 97
100 Planar side of 92
101 Convex side of 93
102 Concave side of 93
103 Central opening of 93
104a, 104b Central beams when using 92
105a, 105b Interference areas when using 92
106 First convex side of 94
107 Second convex side of 94
108 Central area of 94
109 Planar side of 81
110a, 110b Central planar areas of 81
111 Partial beam
120 Diffractive component
121 Imaging lens
122 Objective lens
123 Focal length of 121
124 Focal length of 122
125 Fourier plane of 4f setup
130 First axicon arrangement
131 First axicon of 130
132 Second axicon of 130
135 Third axicon
140 Second axicon arrangement
141 First axicon of 140
142 Second axicon of 140
145 Plano-concave axicon
148 Planar surface of 145
150 Arrangement for generating a donut beam
151 First spiral phase plate of 150
152 Second spiral phase plate of 150
165 Dashed focus
170 Donut beam
180 Ring beam
190 Central beam

What is claimed is:

1. A method for preparing a workpiece for separation, comprising:
providing a workpiece that is transparent for light of a pulsed laser beam and having a surface;
splitting the pulsed laser beam into two partial beams having separate paths using an optical system comprising at least one truncated axicon selected from the group consisting of plano-convex axicon, convex-concave axicon, biconvex axicon, concentric ring grating, and any combination thereof, wherein the pulsed laser beam is split by the truncated axicon, wherein the two partial beams comprise a first partial beam having a ring shape with a first diameter and a second partial beam being a central beam with a second diameter propagating centrally along the optical axis, and wherein the paths of the two partial beams are separate and distinct from one another;
directing the two separate partial beams onto the surface of the workpiece incident at different angles to a normal of the surface so that the focal points of the two separate partial beams are superimposed on one another inside the workpiece so that the partial beams intersect and form a linear sequence of intensity maxima separated by intensity minima, wherein the intensity of the minima is close to zero in the interior of the workpiece in the z direction, and wherein the z-direction extends 90° away from the surface, the sequence of intensity maxima being lined up one after another along an overlapping area of the two partial beams, the intensity maxima modifying a material of the workpiece so that a chain-like periodic pattern of material modifications is formed by the intensity maxima lined up one after another; and
moving the workpiece and the two partial beams relative to one another so that the sequence of intensity maxima form the chain-like periodic pattern into a separation line.

2. The method of claim 1, wherein the step of splitting the pulsed laser beam comprises splitting so that intensities of the two partial beams differ by no more than a factor of 5.

3. The method of claim 1, wherein each of the chain-like periodic pattern is surrounded by a compression zone.

4. The method of claim 1, wherein the step of splitting the pulsed laser beam comprises splitting so that intensities of the two partial beams differ by no more than a factor of 3.

5. A method for preparing a workpiece for separation, comprising:
providing a workpiece that is transparent for light of a pulsed laser beam and having a surface;
splitting the pulsed laser beam into two partial beams having separate paths using an optical system, wherein the pulsed laser beam is split by a truncated axicon that is part of the optical system wherein the paths of the two partial beams are separate and distinct from one another;
directing the two separate partial beams onto the surface of the workpiece incident at different angles to a normal of the surface so that the focal points of the two separate partial beams are superimposed on one another inside the workpiece so that the partial beams intersect and form a linear sequence of intensity maxima separated by intensity minima, wherein the intensity of the minima is close to zero in the interior of the workpiece in the z direction, wherein the z-direction extends 90° away from the surface, the sequence of intensity maxima being lined up one after another along an overlapping area of the two partial beams, the intensity maxima modifying a material of the workpiece so that a chain-like periodic pattern of material modifications is formed by the intensity maxima lined up one after another, and wherein the material modifications occur at the maxima, but not in the area between the maxima; and
moving the workpiece and the two partial beams relative to one another so that the sequence of intensity maxima form the chain-like periodic pattern into a separation line.

6. The method of claim 5, wherein the step of splitting the pulsed laser beam comprises splitting so that intensities of the two partial beams differ by no more than a factor of 3.

* * * * *